(12) United States Patent
Yin et al.

(10) Patent No.: US 9,463,439 B2
(45) Date of Patent: *Oct. 11, 2016

(54) TEMPLATED CATALYST COMPOSITION AND ASSOCIATED METHOD

(71) Applicant: General Electric Company, Schenectady, NY (US)

(72) Inventors: Ming Yin, Rexford, NY (US); Larry Neil Lewis, Scotia, NY (US); Dan Hancu, Clifton Park, NY (US); Oltea Puica Siclovan, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 223 days.

This patent is subject to a terminal disclaimer.

(21) Appl. No.: 14/160,379

(22) Filed: Jan. 21, 2014

(65) Prior Publication Data

US 2014/0199223 A1  Jul. 17, 2014

Related U.S. Application Data

(62) Division of application No. 12/362,533, filed on Jan. 30, 2009, now abandoned.

(51) Int. Cl.
| | |
|---|---|
| *B01J 23/62* | (2006.01) |
| *B01J 37/00* | (2006.01) |
| *B01J 23/50* | (2006.01) |
| *B01D 53/86* | (2006.01) |
| *B01D 53/94* | (2006.01) |
| *B01J 21/04* | (2006.01) |
| *B01J 23/00* | (2006.01) |

(Continued)

(52) U.S. Cl.
CPC ............ *B01J 23/50* (2013.01); *B01D 53/8628* (2013.01); *B01D 53/9418* (2013.01); *B01J 21/04* (2013.01); *B01J 23/002* (2013.01); *B01J 23/60* (2013.01); *B01J 23/687* (2013.01); *B01J 35/002* (2013.01); *B01J 35/04* (2013.01); *B01J 35/1004* (2013.01); *B01J 37/031* (2013.01); *B01D 2255/104* (2013.01); *B01D 2255/1021* (2013.01); *B01D 2255/1025* (2013.01); *B01D 2255/2092* (2013.01); *B01D 2255/90* (2013.01); *B01J 2523/00* (2013.01)

(58) Field of Classification Search
CPC .......... B01J 21/04; B01J 23/50; B01J 23/60;
B01J 23/62; B01J 23/687; B01J 37/00;
B01J 37/0018; B01J 37/033; B01J 37/036;
B01D 53/9418; B01D 2255/104; B01D
2255/1025; B01D 2255/1021
USPC .......... 502/347, 348, 330, 307, 317; 516/88,
516/97; 423/213.2, 239.1
See application file for complete search history.

(56) References Cited

U.S. PATENT DOCUMENTS

| | | |
|---|---|---|
| 4,480,050 A | 10/1984 | Brennan |
| 5,244,852 A | 9/1993 | Lachman |

(Continued)

FOREIGN PATENT DOCUMENTS

| | | |
|---|---|---|
| DE | 4128629 | 8/1999 |
| EP | 0577438 | 5/1994 |

(Continued)

*Primary Examiner* — Patricia L Hailey
(74) *Attorney, Agent, or Firm* — Joseph J. Christian

(57) ABSTRACT

A composition includes a templated metal oxide, at least 3 weight percent of silver, and at least one catalytic metal. A method of making and a method of using are included.

6 Claims, 18 Drawing Sheets

(51) Int. Cl.
  *B01J 23/60*   (2006.01)
  *B01J 23/68*   (2006.01)
  *B01J 35/00*   (2006.01)
  *B01J 35/04*   (2006.01)
  *B01J 35/10*   (2006.01)
  *B01J 37/03*   (2006.01)

(56) References Cited

U.S. PATENT DOCUMENTS

| | | | |
|---|---|---|---|
| 5,302,319 A * | 4/1994 | Wright | C01B 13/32 106/287.17 |
| 5,510,306 A | 4/1996 | Murray | |
| 5,609,839 A | 3/1997 | Itoh | |
| 5,750,459 A | 5/1998 | Marella | |
| 5,770,778 A | 6/1998 | Naujokas | |
| 5,772,972 A | 6/1998 | Hepburn | |
| 5,795,559 A | 8/1998 | Pinnavaia | |
| 5,802,845 A | 9/1998 | Abe | |
| 5,879,645 A | 3/1999 | Park | |
| 5,911,966 A | 6/1999 | Muller | |
| 5,922,294 A * | 7/1999 | Chattha | B01J 21/063 423/213.2 |
| 6,146,602 A | 11/2000 | Narula | |
| 6,169,119 B1 * | 1/2001 | Ryang | C08F 2/44 423/DIG. 14 |
| 6,284,211 B1 | 9/2001 | Miyadera | |
| 6,703,343 B2 | 3/2004 | Park | |
| 6,881,390 B2 | 4/2005 | Yaluris | |
| 6,936,232 B2 | 8/2005 | Gillespie | |
| 7,045,485 B2 | 5/2006 | Kelker | |
| 7,081,231 B1 | 7/2006 | Aardahl | |
| 7,132,165 B2 | 11/2006 | Pinnavaia et al. | |
| 7,214,643 B2 | 5/2007 | Yamamoto | |
| 7,371,358 B2 | 5/2008 | Upchurch | |
| 7,431,905 B2 | 10/2008 | Hancu | |
| 7,485,271 B2 | 2/2009 | Golunski | |
| 7,494,634 B2 | 2/2009 | Vitse | |
| 7,560,408 B2 * | 7/2009 | Calemma | B01J 27/16 502/202 |
| 7,612,011 B2 | 11/2009 | Vanderspurt et al. | |
| 7,655,203 B2 | 2/2010 | Hancu | |
| 7,709,414 B2 | 5/2010 | Fujdala | |
| 7,803,338 B2 | 9/2010 | Socha | |
| 7,867,598 B2 | 1/2011 | Miyairi | |
| 8,034,311 B2 | 10/2011 | Ikeda | |
| 8,037,674 B2 | 10/2011 | Kupe | |
| 8,062,991 B2 | 11/2011 | Male et al. | |
| 8,101,145 B1 | 1/2012 | Norton | |
| 8,353,155 B2 | 1/2013 | Lewis et al. | |
| 8,476,187 B2 | 7/2013 | Norton et al. | |
| 8,505,285 B2 | 8/2013 | Winkler et al. | |
| 8,530,369 B2 | 9/2013 | Lewis et al. | |
| 8,586,501 B2 | 11/2013 | Lewis | |
| 8,664,143 B2 * | 3/2014 | Worsley | H01G 11/86 502/180 |
| 8,969,238 B2 * | 3/2015 | Fehrmann | 423/213.2 |
| 2003/0118960 A1 | 6/2003 | Park | |
| 2003/0176280 A1 | 9/2003 | Caze | |
| 2005/0135980 A1 | 6/2005 | Park | |
| 2005/0198092 A1 | 9/2005 | Shen | |
| 2006/0009349 A1 | 1/2006 | Fujimoto | |
| 2006/0075742 A1 | 4/2006 | Lee | |
| 2006/0133976 A1 | 6/2006 | Male | |
| 2006/0167147 A1 * | 7/2006 | Asgari | A61K 9/0024 524/174 |
| 2006/0228283 A1 | 10/2006 | Malyala | |
| 2007/0059223 A1 | 3/2007 | Golunski | |
| 2007/0101704 A1 | 5/2007 | Goulette | |
| 2007/0149385 A1 | 6/2007 | Liu | |
| 2008/0020925 A1 | 1/2008 | Larcher | |
| 2008/0053073 A1 | 3/2008 | Kalyanaraman | |
| 2008/0085231 A1 | 4/2008 | Vitse | |
| 2008/0124264 A1 | 5/2008 | Ikeda | |
| 2008/0124269 A1 | 5/2008 | Daudey | |
| 2008/0130134 A1 | 6/2008 | Ishida et al. | |
| 2008/0131345 A1 | 6/2008 | Vitse | |
| 2008/0141660 A1 | 6/2008 | Kim | |
| 2009/0004079 A1 | 1/2009 | Hancu | |
| 2009/0074641 A1 | 3/2009 | Lewis | |
| 2009/0075813 A1 | 3/2009 | Whisenhunt | |
| 2009/0263297 A1 | 10/2009 | Hancu | |
| 2009/0318283 A1 | 12/2009 | Keshavan | |
| 2010/0095591 A1 | 4/2010 | Hancu | |
| 2010/0143227 A1 | 6/2010 | Keshavan et al. | |
| 2010/0150801 A1 | 6/2010 | Keshavan et al. | |
| 2010/0196236 A1 | 8/2010 | Lewis et al. | |
| 2010/0196237 A1 | 8/2010 | Yin et al. | |
| 2010/0233053 A1 | 9/2010 | Lewis et al. | |
| 2011/0047988 A1 | 3/2011 | Lewis et al. | |
| 2011/0047995 A1 | 3/2011 | Lewis | |
| 2011/0120100 A1 | 5/2011 | Yin et al. | |
| 2011/0152064 A1 | 6/2011 | Keshavan et al. | |
| 2011/0152068 A1 | 6/2011 | Keshavan et al. | |
| 2011/0166015 A1 | 7/2011 | Norton | |
| 2011/0209466 A1 | 9/2011 | Yin et al. | |
| 2012/0047877 A1 | 3/2012 | Winkler | |
| 2012/0082606 A1 | 4/2012 | Lewis et al. | |
| 2012/0093703 A1 | 4/2012 | Lewis et al. | |
| 2012/0329644 A1 | 12/2012 | Siclovan et al. | |
| 2013/0129575 A1 | 5/2013 | Lewis et al. | |
| 2014/0199222 A1 | 7/2014 | Lewis | |

FOREIGN PATENT DOCUMENTS

| | | |
|---|---|---|
| EP | 0207550 | 9/1995 |
| EP | 0714693 | 6/1996 |
| EP | 9929400 | 6/1996 |
| EP | 0787522 | 8/1997 |
| EP | 1029582 | 8/2000 |
| EP | 0895812 | 7/2003 |
| EP | 0914864 B1 | 8/2007 |
| EP | 1832345 | 9/2007 |
| EP | 1944075 | 7/2008 |
| FR | 2842419 | 1/2004 |
| JP | 4354536 | 8/1992 |
| JP | 6126134 | 5/1994 |
| JP | 06343829 | 12/1994 |
| WO | 2005035108 | 4/2005 |
| WO | 2006027998 | 3/2006 |
| WO | 2006093802 | 9/2006 |
| WO | 2007049851 | 5/2007 |
| WO | 2009038855 | 3/2009 |
| WO | 2009038901 | 3/2009 |
| WO | 2011084484 | 7/2011 |

* cited by examiner

TEMPLATED CATALYST COMPOSITION AND ASSOCIATED METHOD

BACKGROUND

1. Technical Field

The invention includes embodiments that relate to a catalyst composition. The invention includes embodiments that relate to a method of making the catalyst composition and a method of using the catalyst composition for reducing nitrogen oxides.

2. Discussion of Art

Currently, lean NOx traps may be used in exhaust gas treatment systems. In these, NOx reduction catalysts and methods include the alkali and alkali earth metal in the catalyst composition where the alkali metal or the alkali metal absorbs the NOx and the reductant reduces NOx to nitrogen. This type of reaction may not have desirable kinetics.

Silver-containing alumina is known for selective catalytic reduction (SCR) of NOx using linear hydrocarbon reductants. However, reductants containing aromatics like those present in Diesel fuel, lead to poor NOx reduction with concomitant carbon deposition.

Therefore, it may be desirable to have a catalyst composition with properties and characteristics that differ from those properties of currently available compositions or catalysts. It may be desirable to have a method that differs from those methods currently available.

BRIEF DESCRIPTION

In one embodiment, a composition includes a templated metal oxide substrate having a plurality of pores and a catalyst material. The catalyst material includes silver and a catalyst metal. The silver is present in an amount that is at least about three weight percent based on a total weight of the substrate.

In one embodiment, a method of using the said catalyst composition is by introducing a gas stream in a chamber having a composition including a templated metal oxide substrate having a plurality of pores, a catalyst material includes silver and a catalyst metal. The silver is present in an amount of at least about three weight percent based on a total weight of the substrate. The nitrogen oxide present in the gas stream is reduced at a temperature in the range from about 275 degrees to about 350 degrees Celsius in the chamber.

DETAILED DESCRIPTION

The systems and methods described herein include embodiments that relate to a catalyst composition, embodiments that relate to a method of making the catalyst composition, and a method of using the catalyst composition for reducing nitrogen oxides. Generally, disclosed is a NOx reduction catalyst and NOx reduction system for reducing NOx in exhaust gas discharged from a combustion device. Suitable combustion devices may include furnaces, ovens or engines.

As used herein, a catalyst is a substance that can cause a change in the rate of a chemical reaction without itself being consumed in the reaction. A slurry is a mixture of a liquid and finely divided particles. A sol is a colloidal solution. A powder is a substance including finely dispersed solid particles. Templating refers to a controlled patterning; and, templated refers to determined control of an imposed pattern and may include molecular self-assembly. A monolith may be a ceramic block having a number of channels, and may be made by extrusion of clay, binders and additives that are pushed through a dye to create a structure. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

In one embodiment, the composition includes a templated metal oxide substrate having a plurality of pores, and a catalyst material includes both silver and a catalyst metal. The silver is present in an amount that is at least about three weight percent based on a total weight of the substrate.

Figure 1:
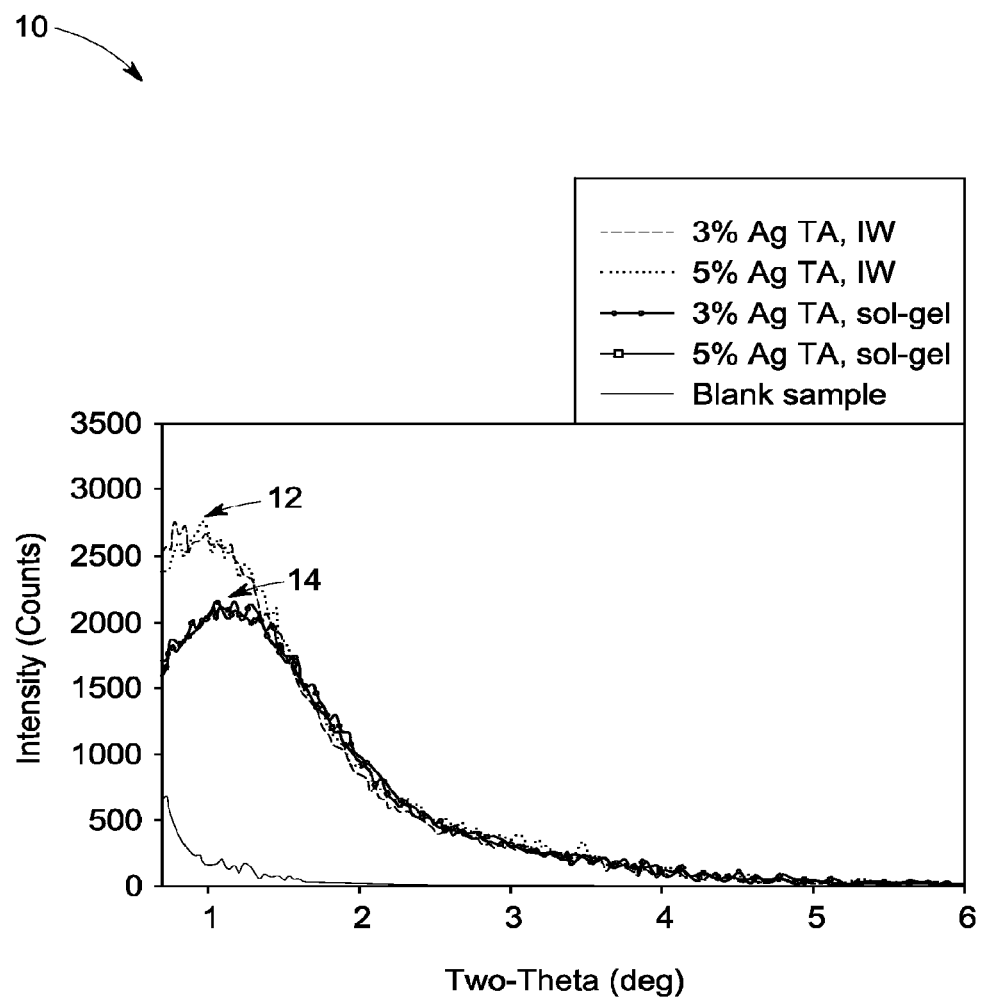
FIG. 1 is a graph of low angle X-Ray Diffraction (XRD) scan.

In addition to being templated, the substrate may have a macro-shape that is, for example, a ceramic honeycomb. With regard to the templating, the substrate material may have a plurality of pores that may have specific dimensions and periodicity. That is, the templated metal oxide may have periodically arranged templated pores of determined dimensions. The dimensions can include pore diameter, degrees of curvature, uniformity of the inner surface, and the like. The average diameter of the pores may be greater than about 2 nanometers. The average diameter of the pores may be less than about 100 nanometers. The average diameter of the pores may be in a range from about 2 nanometers to about 20 nanometers, from about 20 nanometers to about 40 nanometers, from about 40 nanometers to about 60 nanometers, from about 60 nanometers to about 80 nanometers, or from about 80 nanometers to about 100 nanometers. The pores may have a periodicity greater than about 50 Angstroms. The pores may have a periodicity less than about 130 Angstroms. The pores may have a periodicity in the range of from about 50 Angstroms to about 80 Angstroms, from about 80 Angstroms to about 100 Angstroms, from about 100 Angstroms to about 120 Angstroms, or from about 120 Angstroms to about 150 Angstroms. Low angle XRD, FIG. 1, for Ag-Templated Alumina comprising 3 percent or 5 percent silver prepared via sol gel or incipient wetness (IW) method. All samples calcinated at 600 degrees Celsius, show that Ag-Templated Alumina (TA) has pore dimensions of from 75-95 Angstroms depending on the method of preparation. FIG. 1 shows graph 10 that has peak 12 that denotes the average pore-to-pore correlation of about 75 Angstroms and peak 14 denotes the average pore-to-pore correlation of about 95 Angstroms. In one embodiment, the addition of a catalyst metal to the silver does not affect the properties of the templated metal oxide substrate.

The templated porous metal oxide substrate may have a surface area that is greater than about 0.5 meter$^2$/gram. In one embodiment, the surface area is in a range of from about 0.5 meter$^2$/gram to about 10 meter$^2$/gram, from about 10 meter$^2$/gram to about 100 meter$^2$/gram, from about 100 meter$^2$/gram to about 200 meter$^2$/gram, or from about 200 meter$^2$/gram to about 1200 meter$^2$/gram. In one embodiment, the porous substrate has a surface area that is in a range of from about 0.5 meter$^2$/gram to about 200 meter$^2$/gram. In one embodiment, the porous substrate has a surface area in a range of from about 200 meter$^2$/gram to about 250 meter$^2$/gram, from about 250 meter$^2$/gram to about 500 meter$^2$/gram, from about 500 meter$^2$/gram to about 750 meter$^2$/gram, from about 750 meter$^2$/gram to about 1000 meter$^2$/gram, from about 1000 meter$^2$/gram to about 1250 meter$^2$/gram, from about 1250 meter$^2$/gram to about 1500 meter$^2$/gram, from about 1500 meter$^2$/gram to about 1750 meter$^2$/gram, from about 1750 meter$^2$/gram to about 2000 meter$^2$/gram, or greater than about 2000 meter$^2$/gram.

Figure 2:
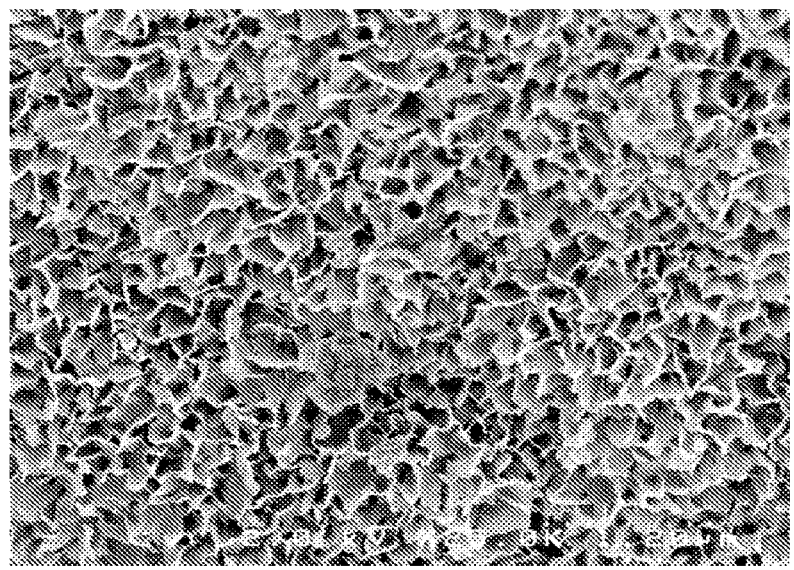
FIG. 2 is an image of scanning electron microscope (SEM) for Ag-Templated Alumina.
Figure 3:
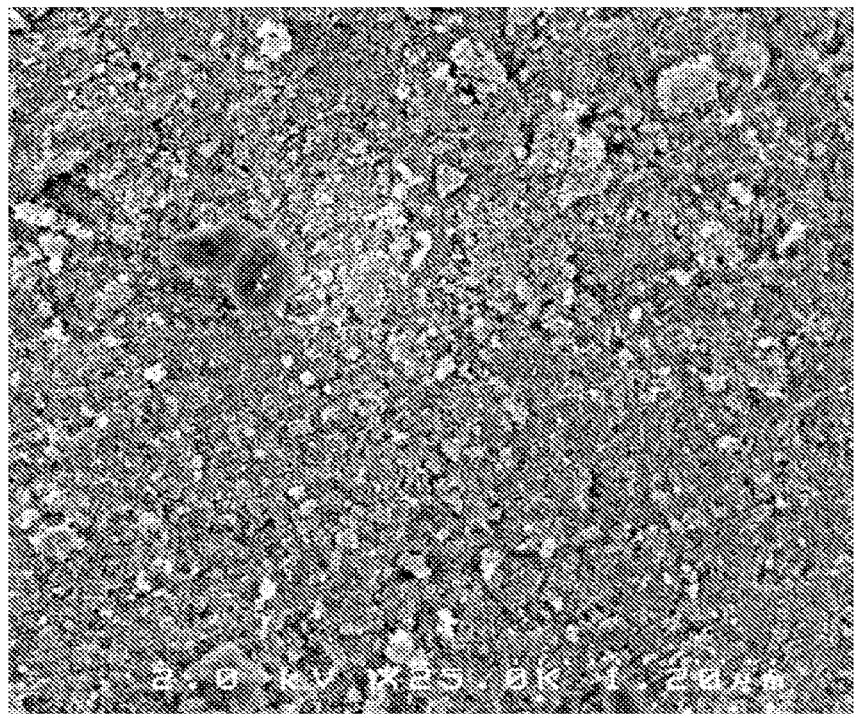
FIG. 3 is an image of scanning electron microscope (SEM) for SBA alumina 200 from SASOL.
Figure 4:
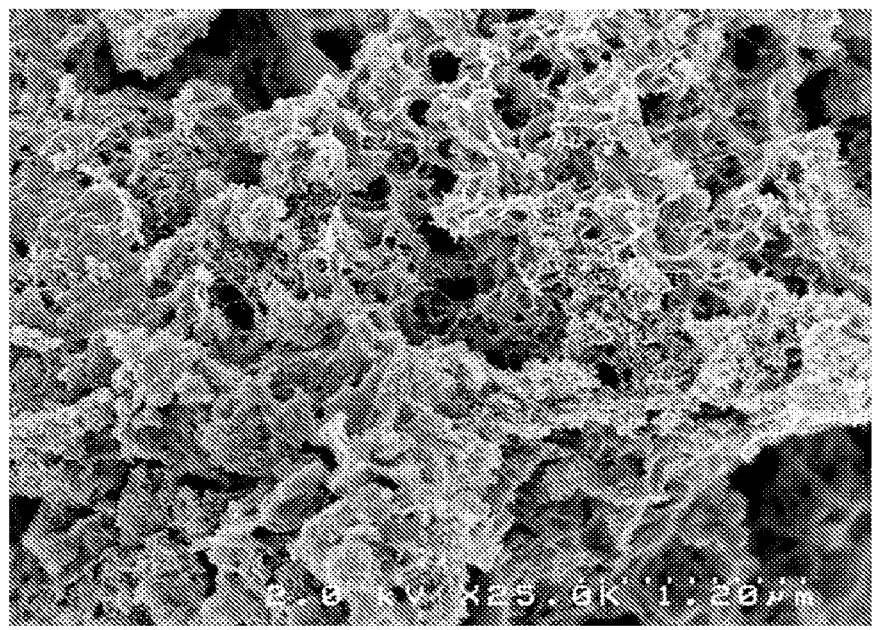
FIG. 4 is an image of scanning electron microscope (SEM) for Norton Alumina.

SEM analysis of Ag-Templated Alumina (TA), FIG. 2, appears to show the high surface area and may show the pore structure. The SEM picture in FIG. 2 is contrasted in FIG. 3 for SBA 200 alumina with lower surface area and lower activity than Ag-TA and similarly for Norton alumina in FIG. 4.

The templated porous metal oxide substrate may be present in the catalyst composition in an amount that is greater than about 50 mole percent. In one embodiment, the amount of templated metal oxide substrate may be in a range of from about 50 mole percent to about 60 mole percent, from about 60 mole percent to about 70 mole percent, from about 70 mole percent to about 80 mole percent, from about 80 mole percent to about 90 mole percent, from about 90 mole percent to about 95 mole percent, from about 95 mole percent to about 98 mole percent, based on the total weight of the catalyst composition.

In one embodiment, the metal oxide is an aluminum oxide. Other support materials may be suitable. These other support materials may include one or more of silicon, titanium or zirconium. Suitable support materials may include, for example, aluminosilicates, aluminophosphates, hexaaluminates, zirconates, titanosilicates, titanates, or a combination of two or more thereof. In other embodiments, other substrates or support materials may be suitable and can be selected based on end-use parameters.

The composition may also have a promoter for the catalytic reaction of nitrogen oxide reduction. Non-limiting examples of the catalyst may include various metals or metal oxides. The promoter may include one or more of indium, gallium, tin, silver, manganese, molybdenum, chromium, germanium, cobalt, nickel, gold, copper, iron, and their oxides. In one embodiment, the promoter includes silver.

In one embodiment, the catalyst material is free of one or both of alkali metal and alkaline earth metal. In one embodiment, the composition reduces NOx without absorbing the NOx on the catalyst material. In this embodiment, the catalytic action is distinct from the actions of a lean NOx trap.

In one embodiment, the catalyst composition may be made by reacting a metal alkoxide with a silver composition, a catalyst metal and a templating agent to form a reaction product. The templating agent may be a surfactant, a cyclodextrin, a crown ether, or mixtures thereof.

The reaction product may hydrolyze to form a hydrolyzed reaction product. The hydrolyzed reaction product may condense to form a templated substrate. The catalyst material loading of the templated substrate may be controlled by controlling the reacting, hydrolyzing and condensing steps. With particular reference to the hydrolyzing step, the rate of hydrolysis can be controlled to affect the reaction product properties, efficacy and function. While completion of the hydrolysis process is a goal, the process by which the hydrolysis is accomplished may be a factor in the reaction product properties, efficacy and function. Slowing the addition rate, and therefore the rate at which the hydrolysis can proceed to completion, is one way to control the final result. While it may be possible to add the reactants together in seconds, improved results may accompany an addition rate of slow and steady addition that is greater than about 1 hour. In one embodiment, the addition is in a time range to completion of from about 1 hour to about 3 hours. In one embodiment, the addition time occurs in an amount of from about 1 hour to about 2 hours, or from about 2 hours to about 3 hours. Adding the reactants in a continuous flow has a different effect relative to adding aliquots in a stepwise fashion over the addition period.

In one embodiment, the silver composition may be selected from a group consisting of silver salt of inorganic acids, silver salt of organic acids, and silver oxides. The silver may be present in an amount of at least about three weight percent based on a total weight of the substrate in one embodiment. In other embodiment, the silver may be present in an amount of less than or equal to about ten weight percent of a total weight of the substrate.

In one embodiment, the catalyst metal is selected from gallium, indium, iron, zirconium zinc, rhodium, platinum, or tungsten. The catalyst metal may be in elemental form, a complex, or as an oxide or equivalent form. For example, the catalyst metal may include tungstate or zirconate. In one embodiment, rather than an oxide form, the complex may include a nitride, carbide, silicide, boride, or aluminide. In one embodiment, the catalyst metal includes both gallium (Ga) and indium (In). In one embodiment, the catalyst metal consists essentially of iron. In one embodiment, the catalyst metal consists essentially of zirconium. In one embodiment, the catalyst metal consists essentially of zinc. In one embodiment, the catalyst metal consists essentially of rhodium. In one embodiment, the catalyst metal consists essentially of platinum. In one embodiment, the catalyst metal consists essentially of tungsten. The choice of catalyst material, the amount, and the combination (if any) or ratio of the combined materials has a direct effect on the function and properties of the resultant product.

In one method of making the catalyst, a metal alkoxide, a silver composition, a catalyst metal and a templating agent are mixed in a vessel with a suitable solvent to form a reaction product. Initially, the reaction product may be in the form of a sol. The sol may be converted to a gel by the sol gel process. The gel may be subject to one or more of filtration, washing, drying and calcinating to yield a solid catalyst composition that includes the catalytic metal disposed on a porous substrate.

The effect of iron on Ag-Templated Alumina catalytic activity is tested by varying the method by which silver is added to templated alumina (TA). The alternative method for introducing silver or any other element is called incipient wetness method whereby the precursor is added to the hydrolyzed and condensed templated alumina as an aqueous solution that wets the alumina followed by calcination. Templated alumina with sol gel silver had superior activity for NOx reduction than templated alumina with incipient wetness (IW) silver. There are alternative methods of adding silver or any other element in the templated alumina and those methods are known as impregnation methods. In one embodiment, the incipient wetness method is a type of impregnation method.

During the calcination process, the silver composition may be reduced to a catalytic metal. The calcination may be conducted at a temperatures in a range of from about 350 degrees Celsius to about 400 degrees Celsius, from about 400 degrees Celsius to about 500 degrees Celsius, from about 500 degrees Celsius to about 600 degrees Celsius, from about 600 degrees Celsius to about 700 degrees Celsius, or from about 700 degrees Celsius to about 800 degrees Celsius. In one embodiment, the calcination may be conducted at a temperature of about 550 degrees Celsius. The calcination may be conducted for a period of from about 10 minutes to about 30 minutes, from about 30 minutes to about 60 minutes, from about 60 minutes to about 1 hour, from about 1 hour to about 10 hours, from about 10 hours to about 24 hours, or from about 24 hours to about 48 hours.

Suitable solvents may include aprotic polar solvents, polar protic solvents, and non-polar solvents. Suitable aprotic polar solvents may include propylene carbonate, ethylene carbonate, butyrolactone, acetonitrile, benzonitrile, nitromethane, nitrobenzene, sulfolane, dimethylformamide, N-methylpyrrolidone, or the like. Suitable polar protic solvents may include water, nitromethane, acetonitrile, and short chain alcohols. Suitable short chain alcohols may include one or more of methanol, ethanol, propanol, isopropanol, butanol, or the like. Suitable non-polar solvents may include benzene, toluene, methylene chloride, carbon tetrachloride, hexane, diethyl ether, or tetrahydrofuran. Co-solvents may also be used. Ionic liquids may be used as solvents during gelation. Exemplary solvents may include short-chain alcohols, such as 2-butanol and 2-propanol.

Selection of the type(s) and amounts of the templating agent may affect or control the pore characteristics of the resultant templated substrate. Suitable templating agents may include one or more surfactants. Suitable surfactants may include cationic surfactants, anionic surfactants, non-ionic surfactants, or Zwitterionic surfactants. In one embodiment, the templating agent may include one or more cyclic species. Examples of such cyclic species may include cyclodextrin and crown ether.

Suitable cationic surfactants may include cetyltrimethyl ammonium bromide (CTAB), cetylpyridinium chloride (CPC), polyethoxylated tallow amine (POEA), benzalkonium chloride (BAC), and benzethonium chloride (BZT). Other suitable cationic surfactants may include those having a chemical structure denoted by $CH_3(CH_2)_{15}N(CH3)_3$-Br, $CH_3(CH_2)_{15}$-(PEO)n-OH where n=2 to 20 and where PEO is polyethylene oxide, $CH_3(CH_2)_{14}COOH$ and $CH_3(CH_2)_{15}NH_2$. Other suitable cationic surfactants may include one or more fluorocarbon surfactants, such as $C_3F_7O$ $(CFCF_3CF_2O)_2CFCF_3$—$CONH(CH_2)_3N(C_2H_5)_2CH_3I)$, which is commercially available as FC-4.

Suitable anionic surfactants may include one or more of sodium dodecyl sulfate (SDS), ammonium lauryl sulfate, alkyl sulfate salts, sodium laureth sulfate also known as sodium lauryl ether sulfate (SLES), alkyl benzene sulfonate, soaps, fatty acid salts, or sodium dioctyl sulfonate (AOT). Suitable Zwitterionic surfactants may include dodecyl betaine, dodecyl dimethylamine oxide, cocamidopropyl betaine, or coco ampho-glycinate.

Nonionic surfactants may have polyethylene oxide molecules as hydrophilic groups. Suitable ionic surfactants may include alkyl poly(ethylene oxide), copolymers of poly (ethylene oxide) and poly(propylene oxide) commercially called Poloxamers or Poloxamines and commercially available under the trade name PLURONICS from the BASF company.

Suitable non-ionic surfactants may include one or more alkyl polyglucosides, octylphenol ethoxylate, decyl maltoside, fatty alcohols, cetyl alcohol, oleyl alcohol, cocamide monoethanolamine, cocamide diethanolamine, cocamide triethanolamine, 4-(1,1,3,3-tetramethyl butyl) phenyl-poly (ethylene glycol), polysorbitan monooleate, or amphiphilic poly(phenylene ethylene) (PPE). Suitable poly glucosides may include octyl glucoside. Other suitable non-ionic surfactants may include long-chain alkyl amines, such as primary alkylamines and N,N-dimethyl alkylamines. Suitable primary alkylamines may include dodecylamine and hexadecylamine. Suitable N,N-dimethyl alkylamines may include N,N-dimethyl dodecylamine or N,N-dimethyl hexadecylamine. Suitable non-ionic surfactant may include (1,1, 3,3-Tetramethylbutyl) phenyl-polyethylene glycol, which is commercially available as TRITON X-114 from the Sigma-Aldrich company.

In one embodiment, the templating agent may include cyclodextrin. Cyclodextrins may include cyclic oligosaccharides that include five or more α-D-glucopyranoside units linked 1 to 4, as in amylose (a fragment of starch). Suitable cyclodextrins in the templating agent may include 5-membered to about 150-membered cyclic oligosaccharides. Exemplary cyclodextrins include a number of glucose monomers ranging from six to eight units in a ring. Suitable cyclodextrins are α-cyclodextrin, a six membered sugar ring molecule; β-cyclodextrin, a seven sugar ring molecule; γ-cyclodextrin, an eight sugar ring molecule; or the like.

As noted above, the templating agent may include crown ethers. Crown ethers are heterocyclic chemical compounds that include a ring containing several ether groups. Suitable crown ethers may include oligomers of ethylene oxide, the repeating unit being ethyleneoxy, i.e., —CH2CH2O—. Useful members of this series may include the tetramer (n=4), the pentamer (n=5), and the hexamer (n=6). Crown ethers derived from catechol may be used in the templating agent. Crown ethers that strongly bind certain types of cations to form complexes may be included in the templating agents. The oxygen atoms in the crown ether may coordinate with a cation located at the interior of the ring, whereas the exterior of the ring may be hydrophobic. For example, 18-crown-6 has high affinity for potassium cation, 15-crown-5 for sodium cation, and 12-crown-4 for lithium cation.

In one embodiment, a method of using the said catalyst composition may be by introducing a gas stream in a chamber having a composition comprising a templated metal oxide substrate having a plurality of pores, a catalyst material comprising silver. The silver may be present in an amount of at least about three weight percent based on a total weight of the substrate. The nitrogen oxide present in the gas stream may be reduced at a temperature of about 275 degrees Celsius or greater. In one embodiment, the reduction may occur at a temperature range of from about 275 degrees Celsius to about 300 degrees Celsius, from about 300 degrees Celsius to about 325 degrees Celsius, or from about 325 degrees Celsius to about 350 degrees Celsius. The nitrogen oxide present in the gas stream may be reduced at a temperature of less than about 350 degrees Celsius in the chamber.

As noted in the disclosure, the composition can include a templated mesoporous metal oxide substrate, catalyst metal, and an amount silver. The composition can be entirely free of alkaline earth metal, and may reduce NOx without absorbing the NOx on the catalyst material surface. Further, possibly owing to the method of formation, the templated metal oxide and silver may have a distinguishable visible-ultra-violet (VIS-UV) absorbance intensity that is at least 20 percent less than a standard silver alumina catalyst (Ag STD) at a wavelength in a range of from about 350 nm to about 500 nm, at under $H_2$ at 30 degrees Celsius. The standard silver alumina has alumina as Norton alumina, and which have the same amount of silver by weight. One difference affecting the absorbance may be the form, size and distribution of the silver relative to the templated metal oxide. The addition of the catalyst metal may further affect the efficacy, performance and function of the final reaction product.

EXAMPLES

Example 1

A process for templated alumina includes the preparation of the following solutions. Solution 1 is ethyl acetoacetate (26.5 g, 0.2 mol), TRITON X-114 (85 g, ca. 0.15 mol) and 2-butanol (500 mL), which are combined in a 5-liter, 3-neck flask equipped with an addition funnel, a condenser a mechanical stirrer. Solution 2 is $Al(O-secBu)_3$ (500 g, 2 mol) and 2-BuOH (2L). Solution 3 is water (75 mL, 4 mol) and 2-BuOH (850 mL).

Solution 1 is added to Solution 2 with stirring, and the combined volume is held at ambient temperature for 30 minutes. Solution 3 is added to the combined solutions 1 and 2 via an addition funnel over 90 minutes. Mechanical stirring continues at ambient temperature for 3 hours, and the contents are heated to reflux for about 20 to 24 hours.

The contents are cooled and are filtered on #50 filter paper. The contents are washed with ethanol. The obtained white solid is dried in a vacuum oven at 80 degrees Celsius. The solid is subjected to Soxhlet extraction with ethanol for 20-24 h. The solid is dried in a vacuum oven at 80 degrees Celsius, and yields 164 grams. The dry material is heated under $N_2$ in a tube furnace from room temperature to 550 degrees Celsius at a heating rate of 2 degrees Celsius/minute, maintained at 550 degrees Celsius for 1 hr and finally calcined in a flow of air at 550 degrees Celsius for 5 hours.

A process for forming templated metal oxide with silver includes the following. A 5-liter, 3-necked flask equipped with a mechanical stirrer, a reflux condenser, and an addition funnel is charged with TRITON X114 (68.7 g, 0.16 mol) and ethylacetoacetate (13.2 g, 0.1 mol) in 250 mL of 2-propanol. An amount of $Al(O^{sec}Bu)_3$ (249.8 g, 1.02 mol) that is dissolved or suspended in 1-liter of 2-propanol is added to the flask. The contents are stirred for 30 minutes. An amount of silver nitrate ($AgNO_3$) is dissolved in water (37 mL, 2.06 mol). The silver nitrate solution is changed/varied as noted below to create a number of reaction products. The silver nitrate solution is combined with 500 mL of 2-propanol and is charged to an addition funnel. The contents of the addition funnel are added to a 5-liter flask over the course of 75 minutes. The stirred solution is refluxed for 24 hours.

After cooling, the contents are filtered and washed with about 250 mL of ethanol to obtain a semi-dried mass. The semi-dried mass is subjected to Soxhlet extraction with ethanol for 24 hours and oven-vacuum dried at 30 mmHg for 24 hours to obtain a solid. The obtained brown solid is condensed, which here is calcined, under nitrogen in a tube furnace to 550 degrees Celsius at a heating rate of 2 degrees Celsius/minute to obtain a reaction product.

A series of Catalyst Products are formed. The amount of $AgNO_3$ (2.6 g, 0.0158 mol) for Catalyst Product 1, results in 3 percent silver templated alumina catalyst composition. The amount of $AgNO_3$ (3.463 g, 0.0204 mol) for Catalyst Product 2, results in 4 percent silver templated alumina catalyst composition. The amount of $AgNO_3$ (4.407 g, 0.0259 mol) for Catalyst Product 3, results in 5 percent silver templated alumina catalyst composition. The amount of $AgNO_3$ (5.383 g, 0.0317 mol) for Catalyst Product 4, results in 6 percent silver templated alumina catalyst composition. The amount of $AgNO_3$ (6.391 g, 0.0376 mol) for Catalyst Product 5, results in 7 percent silver templated alumina catalyst composition. The amount of $AgNO_3$ (7.49 g, 0.0441 mol) for Catalyst Product 6, results in 8 percent silver templated alumina catalyst composition. The amount of $AgNO_3$ (8.443 g, 0.0497 mol) for Catalyst Product 7, results in 9 percent silver templated alumina catalyst composition.

Catalyst Product 8—Templated Alumina with 8 percent Silver having a different solvent: A 5 L 3-neck round bottom flask equipped with a mechanical stirrer, reflux condenser, and addition funnel is charged with ethyl acetoacetate (13.26 g, 0.1019 mol), TRITON X114 (69.73 g, 0.1117 mol) and 250 mL of 2-Butanol. The stirrer is turned on low. Aluminum sec-butoxide (250.96 g, 1.0188 mol) is dissolved in 1 Liter of 2-BuOH and transferred to the 5 L flask. This reaction mixture is stirred under ambient conditions for 30 minutes. $AgNO_3$ (7.49 g, 0.0441 mol) is dissolved in 37.5 mL of distilled $H_2O$ and combined with 425 mL of 2-BuOH to produce a transparent, clear solution. This solution is added via dropping funnel to the 5 L flask. The stir speed is adjusted to account for changing viscosity of the fluid, water addition occurred over the course of 2-3 hours. The mixture is aged at 95 degrees Celsius for 24 hours.

Two different processes are carried out with portions of the obtained slurry. 1.) Alumina-water slurry. Distilled water (1.47 L) is added to the flask in order to remove butanol via azeotropic distillation (bp ca. 87 degrees Celsius) and to yield a water slurry of 5 percent solids. 2.) Extracted Solid. The obtained slurry described above is filtered through a #50 filter paper on a Buchner funnel, washed with ethanol and the obtained solid is extracted with ethanol in a Soxhlet apparatus. The solid is dried in a vacuum oven at 80 degrees Celsius, yielding 164 grams. The dry material is heated under $N_2$ in a tube furnace from room temperature to 550 degrees Celsius at a heating rate of 2 degrees Celsius/min, maintained at 550 degrees Celsius for 1 hr and calcined in a flow of air at 550 degrees Celsius for 5 hours to get Catalyst Product 8.

Figure 5:
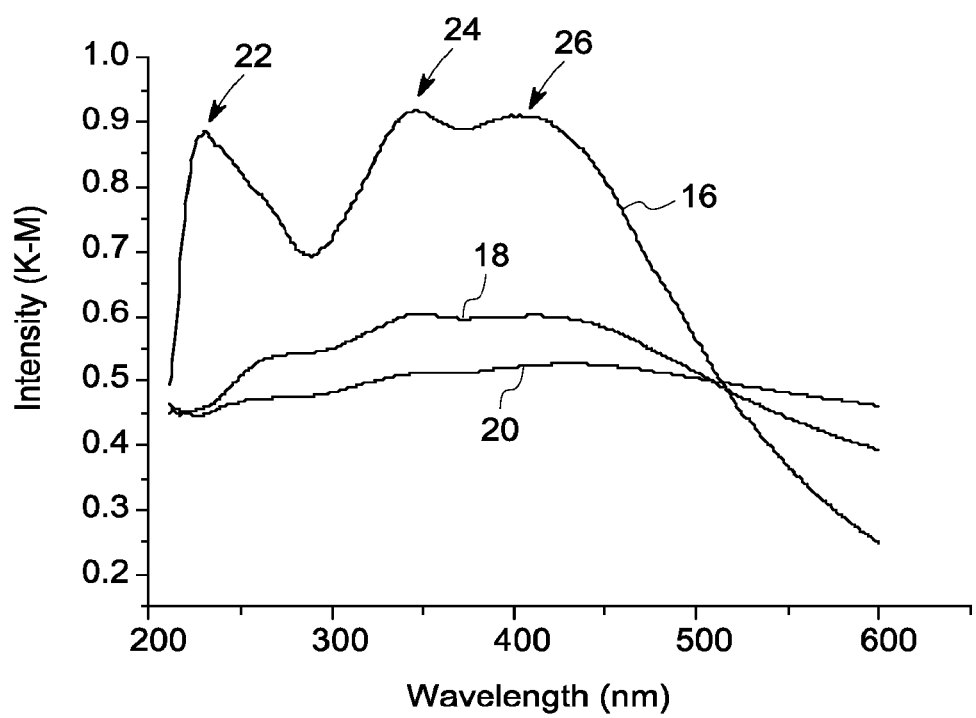
FIG. 5 is a visible-ultra-violet spectrum of a catalytic material.

FIG. 5 is a graph that plots VIS-UV absorbance intensity at different wavelengths. The plot compares the Comparative Ag STD, Ag TA (sol-gel) and Ag TA (impregnated), all having the same Ag percent. The test conditions are under $H_2$ at 30 degrees Celsius (spectra have been subtracted with the ones from fresh catalyst under He at 30 degrees Celsius). The Ag TA (sol-gel) is a silver templated alumina catalyst made by the sol gel process and Ag TA (impregnated) is a silver templated alumina catalyst made by the impregnation process. Particularly, Curve 16 is a comparative plot for 8 percent Ag with standard Norton alumina under $H_2$ at 30 degrees Celsius. Curve 18 is a plot for 8 percent Ag with templated alumina made by sol gel method under $H_2$ at 30 degrees Celsius (Catalyst Product 8). Curve 20 is a plot for 8 percent Ag with templated alumina made by impregnation method under $H_2$ at 30 degrees Celsius. In FIG. 5, curve 16 indicates the amount of silver ion ($Ag^+$) agglomeration, the peak is identified with reference number 22, silver (Ag) cluster agglomeration, peak 24, and Ag particles agglomeration, peak 26.

Figure 6:
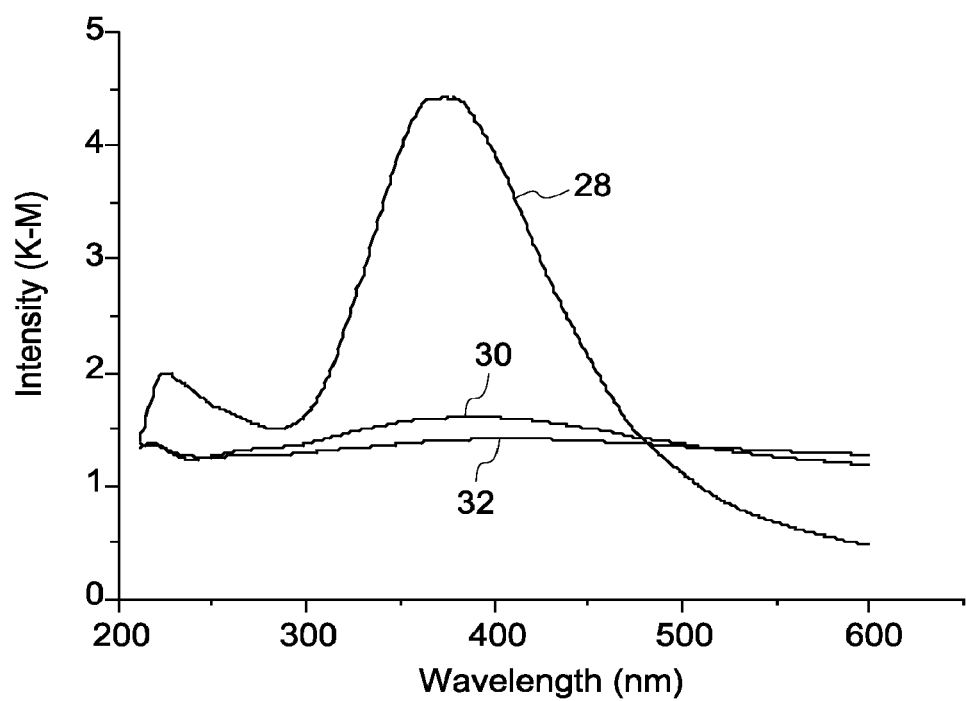
FIG. 6 is a visible-ultra-violet spectrum of a catalytic material.

FIG. 6 is a graph that plots VIS-UV absorbance intensity at different wavelengths. Curve 28 is a comparative plot for 8 percent Ag with standard Norton alumina under $H_2$ at 300 degrees Celsius. Curve 30 is a plot for 8 percent Ag with templated alumina made by sol gel method under $H_2$ at 300 degrees Celsius (Catalyst Product 6). Curve 32 is a plot for 8 percent Ag with templated alumina made by impregnation method under $H_2$ at 300 degrees Celsius. For the standard silver alumina catalyst (curve 18) the agglomeration is very high whereas for the silver templated alumina catalyst the agglomeration is low, showing the relatively different properties with regard to the silver templated alumina catalyst.

With respect to FIG. 6 the graph that shows the Catalyst Product 6 is having a VIS-UV absorbance intensity that is at least 20 percent less than a comparative silver alumina catalyst (Ag STD). The standard alumina is Norton alumina, and which has the same amount of silver by weight, at a wavelength in a range of from about 350 nm to about 500 nm, under $H_2$ at 30 degrees Celsius.

Catalyst Product 6 has a visible-ultra-violet (VIS-UV) absorbance intensity that is at least 20 percent less than a standard silver alumina catalyst (Ag STD), under $H_2$ at 30 degrees Celsius and at a wavelength that is in a range of from about 350 nanometers (nm) to about 500 nm. The standard alumina is Norton alumina, and has the same amount of silver by weight as the instant composition. FIGS. 5 and 6 indicate an amount of silver (Ag) agglomeration (Ag particles and mainly Ag clusters) and silver ion ($Ag^+$) agglomeration. For the standard silver alumina catalyst, the agglomeration is relatively high, whereas for the silver templated alumina catalyst the agglomeration is relatively low. The agglomeration level affects, and possibly controls, the function and efficacy of the corresponding material.

Example 2

Zirconium

In the following examples, at least one compositional species is shown in detail. Compositional variations are performed for the purpose of examining larger data sets, but are not included in detail for the sake of clarity. Example 2 includes the preparation of 3 percent Ag-templated alumina (TA)+0.25 percent Zr as $Zr(O(CH_2)_3CH_3)_4$—$CH_3(CH_2)_3OH$ replacing Alumina. A 1000 mL 3-neck round bottom flask is set-up in an oil bath with stir bar and equipped with a mechanical stirrer, reflux condenser and addition funnel. A dropping funnel for hydrolysis later replaces the addition funnel.

An amount of 50.81 g (0.2063 mol) of Aluminum sec-butoxide ($Al(O^{sec}Bu)_3$) are dissolved in 200 mL of 2-Butanol (2-BuOH) and added to the flask. The 2-BuOH is divided in half, one used to transfer the $Al(O^tBu)_3$ and the other the rinse the remaining portion from the container walls. After addition to the flask, the mechanical stirrer is turned on using a low setting. 2.674 g (0.0205 mol) of Ethyl acetoacetate (EA), 14.084 g (0.02257 mol) Triton X-114, and 60 mL 2-BuOH are combined and added to the flask with the $Al(O^{sec}Bu)_3$ solution. This solution is allowed to stir under ambient conditions for 30 minutes. 0.243 g (5.308E-04 moles) $Zr(O(CH_2)_3CH_3)_4$—$CH_3(CH_2)_3OH$ are dissolved in 2-BuOH for transfer and added to the flask. The mixture is stirred for additional time at a medium pace. $AgNO_3$ (0.5356 g, 0.00315 mol) is dissolved in 7.5 mL $H_2O$ and is combined with 85 mL of 2-BuOH. This solution is added to the dropping funnel, which is put in place of the addition funnel. After approximately 45 minutes elapsed, the dropping funnel is turned on and allowed to drip at a controlled pace. Controlling the addition rate and operating parameters affects the hydrolysis rate, and therefore the properties and function of the reaction product.

After the hydrolysis is complete, the stirrer is turned up to account for the gaining viscosity of the mixture and a stopper replaced the dropping funnel. The mixture is stirred under ambient conditions for approximately 3 hours following the completion of hydrolysis. After 3 hours, the reaction mixture is aged at 95 degrees Celsius for 24 hours with stirring. The resulting gel is filtered overnight and extracted using Soxhlet Extraction with ethanol (EtOH) for 24 hours. The extracted solid is dried in a vacuum oven at 50 degrees Celsius overnight.

Figure 7:
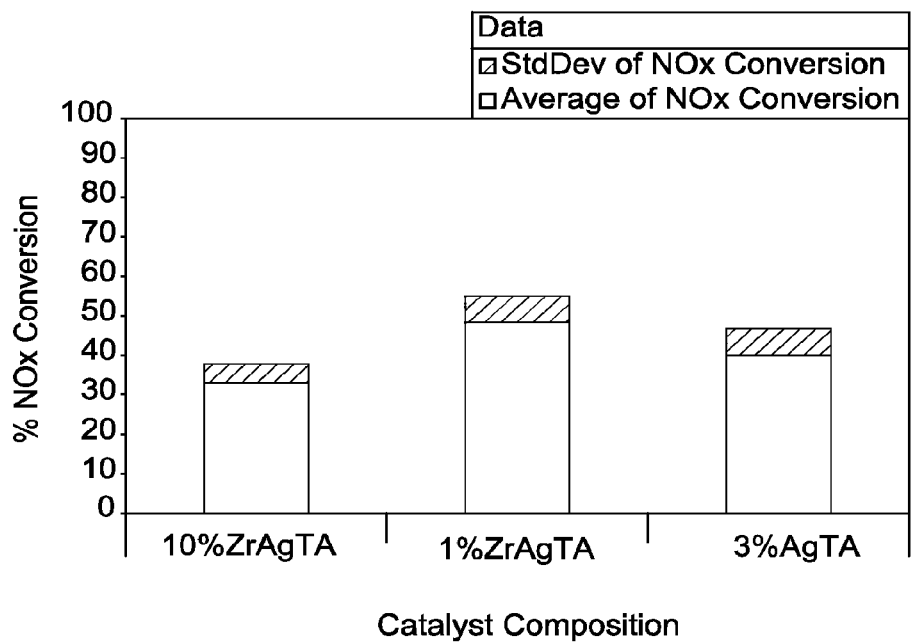
FIGS. 7 and 8 are graphical representations of NOx conversion.
Figure 8:
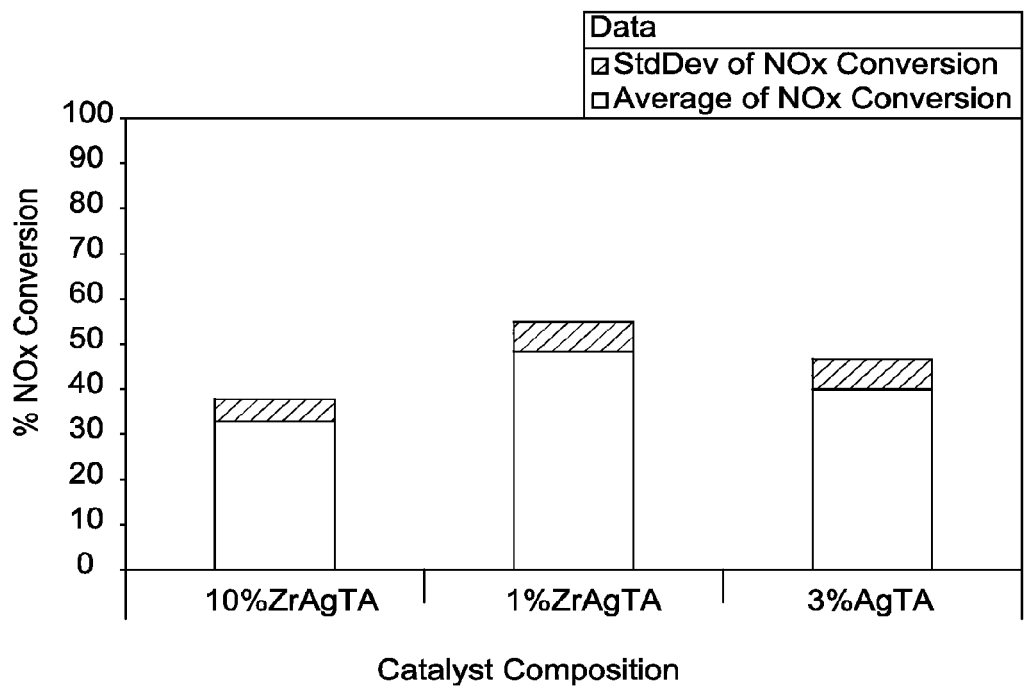

Several samples are prepared, each having 3 percent Ag TA and each having a differing level of zirconia. Some of these new materials show enhanced catalytic activity, and are shown compared to 3 percent Ag TA alone. FIGS. 7 and 8 are graphical representations of average NOx Conversion, and standard deviation, at 325 degrees Celsius (FIG. 7) and 375 degrees Celsius (FIG. 8) for 3 percent Ag-TA (far left); 3 percent Ag-TA with 1 percent zirconia (middle); and 3 percent Ag-TA 10 percent zirconia (far right). As shown with reference to FIGS. 7 and 8, the improved activity occurred with a 1 percent but not with 10 percent framework substitution of aluminum with zirconium. Unexpectedly, adding more catalyst metal had the reverse effect on efficacy.

Figure 9:
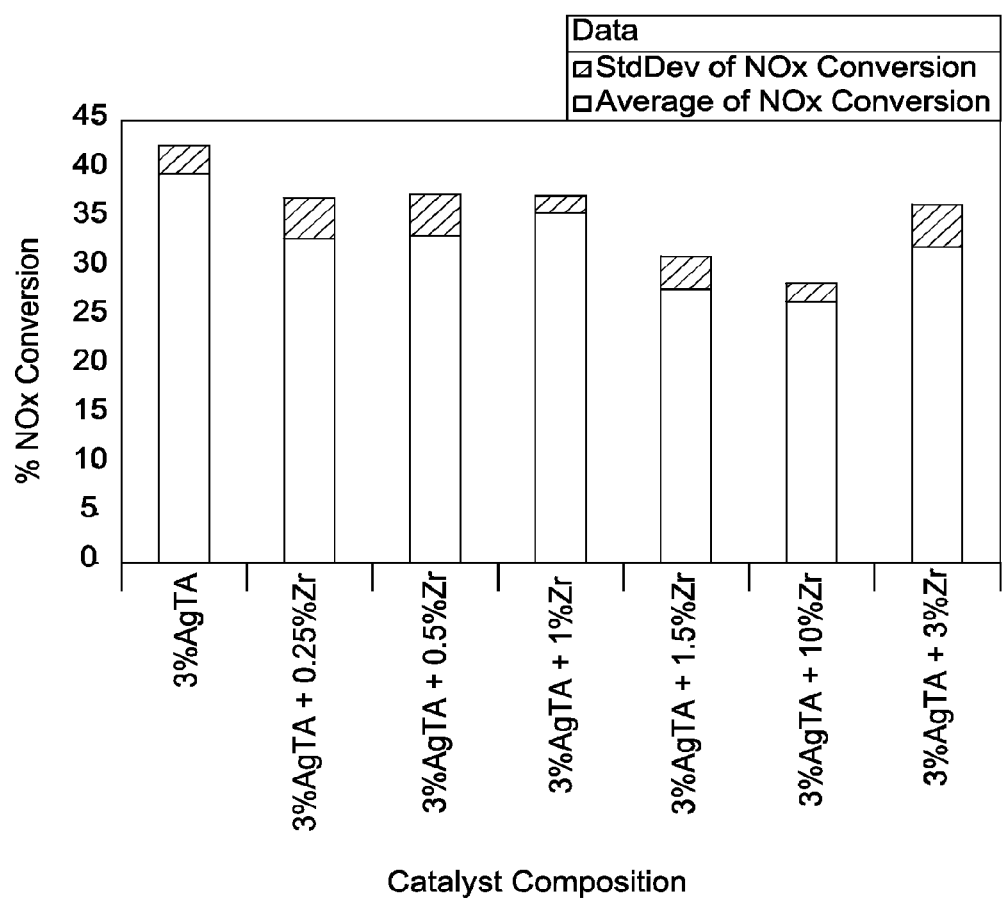
FIGS. 9 and 10 are graphical representations of NOx conversion.
Figure 10:
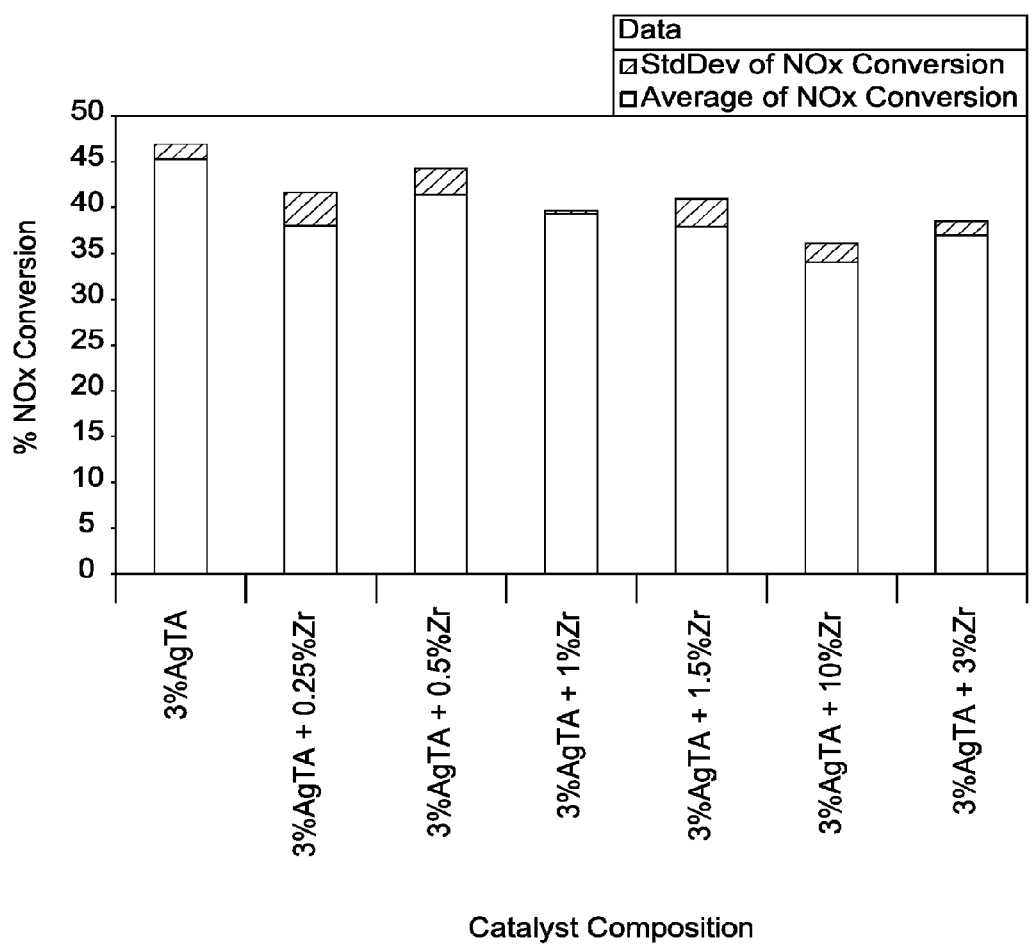

FIGS. 9 and 10 are graphical representations of average NOx Conversion and standard deviation at 325 degrees Celsius (FIG. 9) and 375 degrees Celsius (FIG. 10) for differing values of catalyst metal. As shown in FIGS. 9 and 10, catalytic activity for NOx reduction varies as a function of zirconia loading and of temperature. A 0.5 to 1 mol percent zirconia has the highest activity compared to the other zirconia-containing compositions in the experiment. Simply adding more catalyst metal does not increase efficacy.

Example 3

Iron

Example 3 includes the preparation of 3 percent Ag-Templated alumina (TA) with 0.5 percent iron (Fe) as $Fe(NO_3)_2 \cdot 9H_2O$ supported by $Al_2O_3$. A 1-liter, 3-neck round bottom flask is set-up in an oil bath with stir bar and equipped with a mechanical stirrer, reflux condenser and addition funnel. A dropping funnel for hydrolysis later replaced the addition funnel. After the set-up is complete, 50.9 g (0.2066 mol) of Aluminum sec-butoxide (Al(O$^{sec}$Bu)$_3$) are dissolved in 200 mL of 2-Butanol (2-BuOH) and added to the flask. The 2-BuOH is divided in half, one used to transfer the Al(O$^{sec}$Bu)$_3$ and the other to remove the remaining portion from the container walls. Following the addition to the flask, the mechanical stirrer is turned on using a low setting. 2.648 g (0.0203 mol) of Ethyl acetoacetate (EA), 14.150 g (0.02268 mol) Triton X-114, and 60 mL 2-BuOH are combined and added to the flask with the Al(O$^{sec}$Bu)$_3$ solution. The mixture is stirred for 30 minutes at a medium pace. During the 30-minute ambient stir period, 0.5345 g (0.003147 mol) of AgNO$_3$ are dissolved in 7.6 mL H$_2$O and combined with 85 mL of 2-BuOH. This solution is added to the dropping funnel, which is put in place of the addition funnel. After the 30 minutes elapsed, the dropping funnel is turned on and allowed to drip at a medium pace. After the hydrolysis is complete, the stirrer is turned up to gain viscosity of the mixture and a stopper replaces the dropping funnel.

The mixture is stirred under ambient conditions for approximately 3 hours following the completion of hydrolysis. After 3 hours, the reaction mixture is aged at 95 degrees Celsius for 24 hours with stirring. Approximately 30 minutes before the completion of the aging period, 0.2062 g (5.104E-04 mol) of Fe(NO$_3$)$_2$-9H$_2$O is dissolved in just enough deionized H$_2$O and added to the flask. The mixture is allowed to stir for an extra hour. The resulting gel is filtered overnight and extracted using Soxhlet Extraction with ethanol (EtOH) for 24 hours. The extracted solid is dried in a vacuum oven at 50 degrees Celsius overnight.

Figure 11:
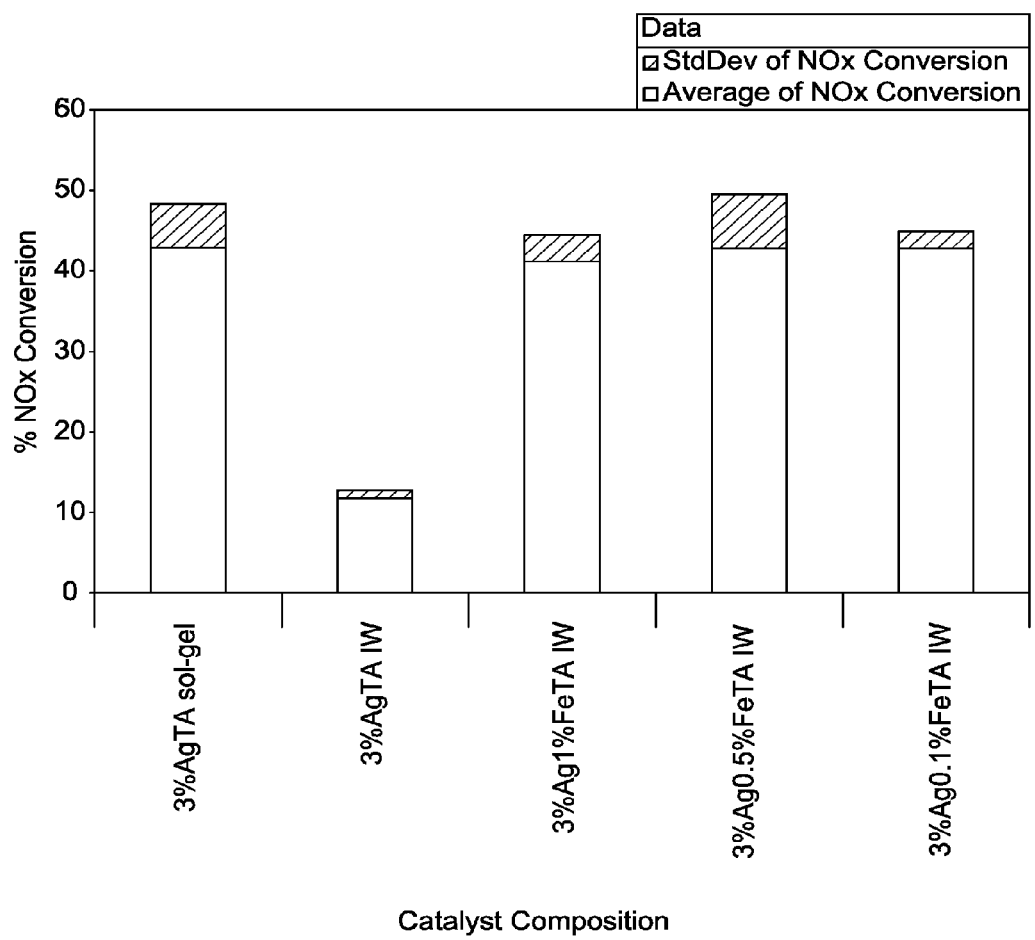
FIGS. 11 and 12 are graphical representations of NOx conversion.
Figure 12:
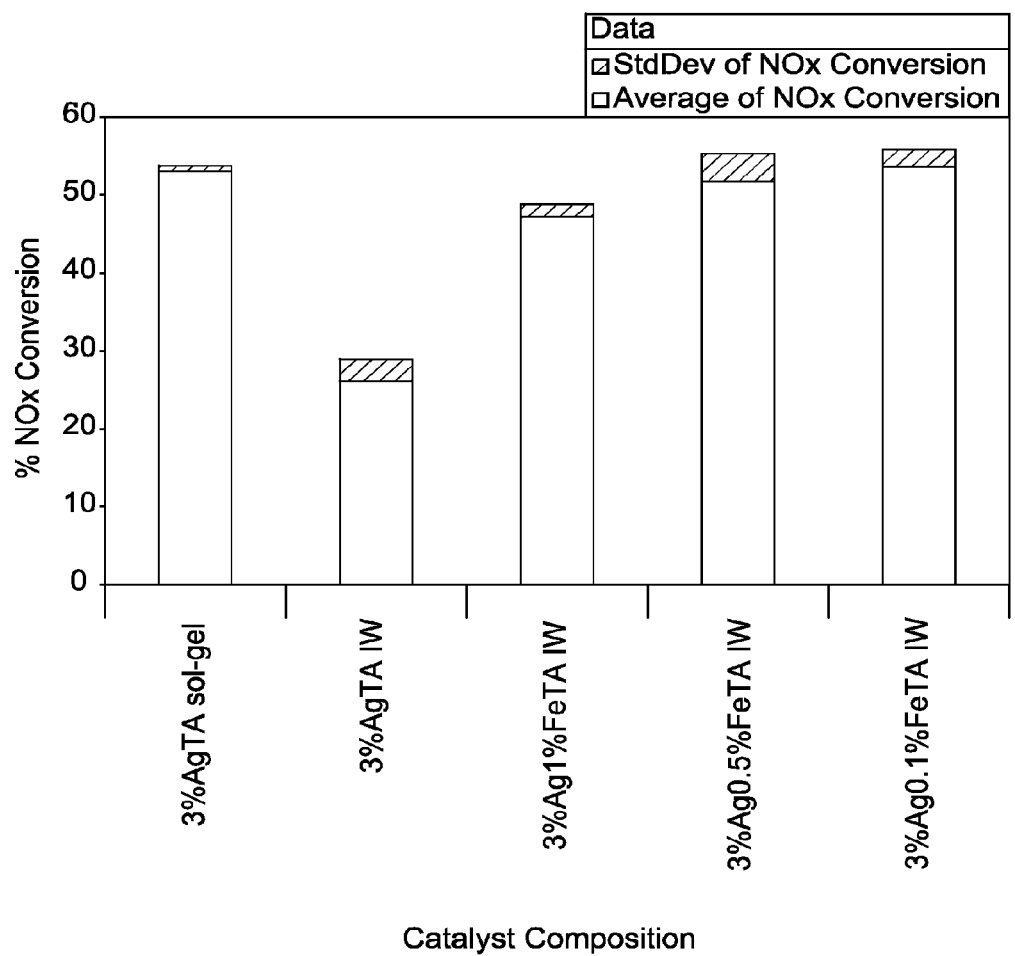

FIGS. 11 and 12 are graphical representations of average NOx conversion, and standard deviation, at 325 degrees Celsius (FIG. 11) and 375 degrees Celsius (FIG. 12) for (from left to right) 3 percent Ag-TA sol gel; 3 percent Ag-TA IW; 3 percent Ag-TA with 1 percent iron IW; 3 percent Ag-TA with 0.5 percent iron IW; and 3 percent Ag-TA with 0.1 percent iron 1W. As shown in FIGS. 11 and 12, TA with sol gel silver had superior activity for NOx reduction than TA with incipient wetness (IW) silver. However, it is unexpected that the level of activity that is achievable with the sol-gel method can be achieved using incipient wetness method, by the addition of a transition metal as a catalyst— in this instance iron. Some TA with IW silver and IW iron of various levels displayed catalytic activity similar to that for Ag-TA sol gel. Also, unexpectedly, there is an inflexion point such that there is not a proportional relationship between the amount of catalyst material and the efficacy. That is, merely adding more catalyst does not increase catalytic activity. At the higher test temperature, the indicated trend is that adding less iron increases the catalytic activity until some point where no iron is present, and at which point the efficacy plummets.

Example 4

Gallium and Indium

Example 4 includes the preparation of 3 percent Ag-Templated Alumina with a combination of 2 percent gallium and 0.5 percent indium. A 1-liter, 3-necked flask equipped with a mechanical stirrer and an addition funnel is charged with Al(O$^{sec}$Bu)$_3$ (97.5 g, 0.396 mol) and dissolved in 400 ml 2-butanol. Ga(OiPr)$_3$ (2.0054 g, 0.00812 moles) is added to the stirring reaction mixture as a solid. In(OiPr)$_3$ (11.86 nil solution 5 percent w/v, 0.00203 moles) is also added to the reaction mixture via a syringe. The flask is charged with ethyl acetoacetate (5.3 grams, 0.04 mol) and TRITON X-114 (28 grams) in 120 ml 2-butanol. The reaction mixture is stirred until all the Ga(OiPr)$_3$ is dissolved (about 2 hrs) at room temperature. A solution composed of 170 ml 2-butanol, 15 ml H$_2$O, AgNO$_3$ (1.0398 g, 0.0061 moles) is added drop wise from a dropping funnel to the reaction mixture under continuous stirring from an overhead stirrer. After addition of the entire amount of the water solution, the resulting reaction mixture is stirred at room temperature for 3 hours, and is aged for 24 hours at 95 degrees Celsius. The resulting gel is filtered overnight. The excess surfactant is removed by Soxhlet extraction with ethanol for 24 hours. The obtained solid is dried in a vacuum oven at 50 degrees Celsius overnight.

Figure 13:
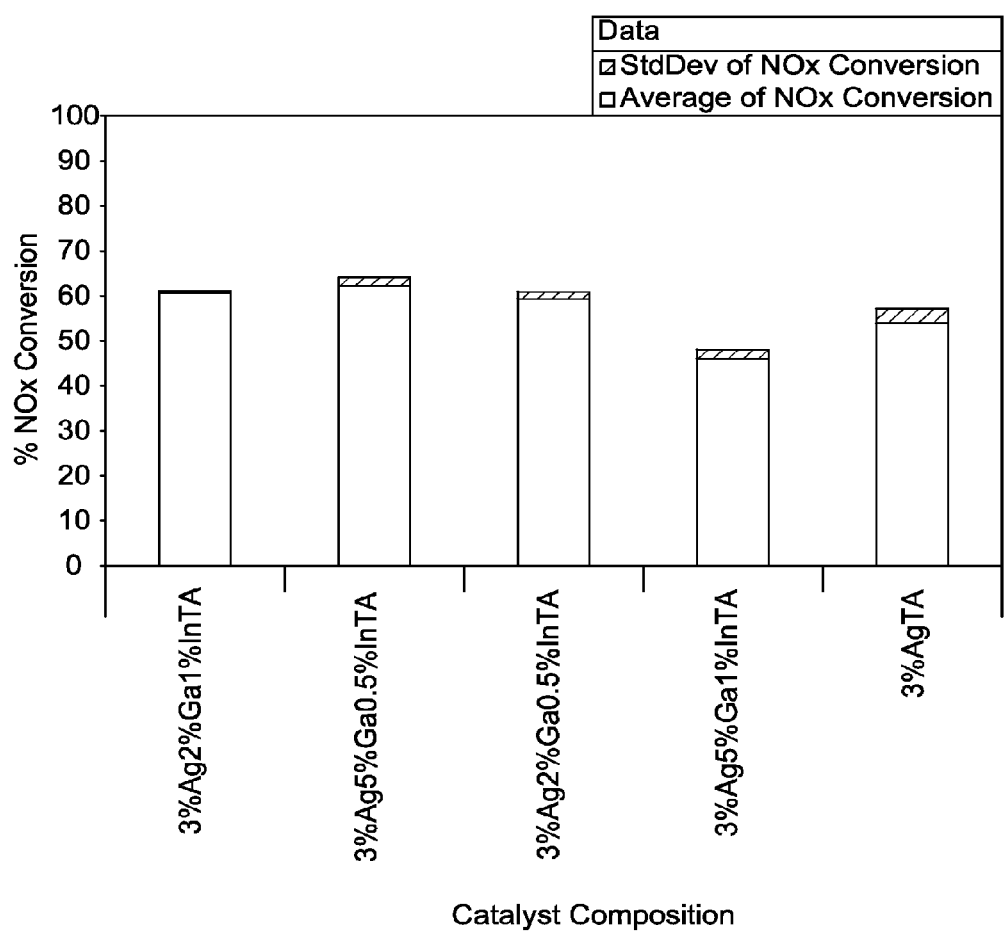
FIGS. 13 and 14 are graphical representations of NOx conversion.
Figure 14:
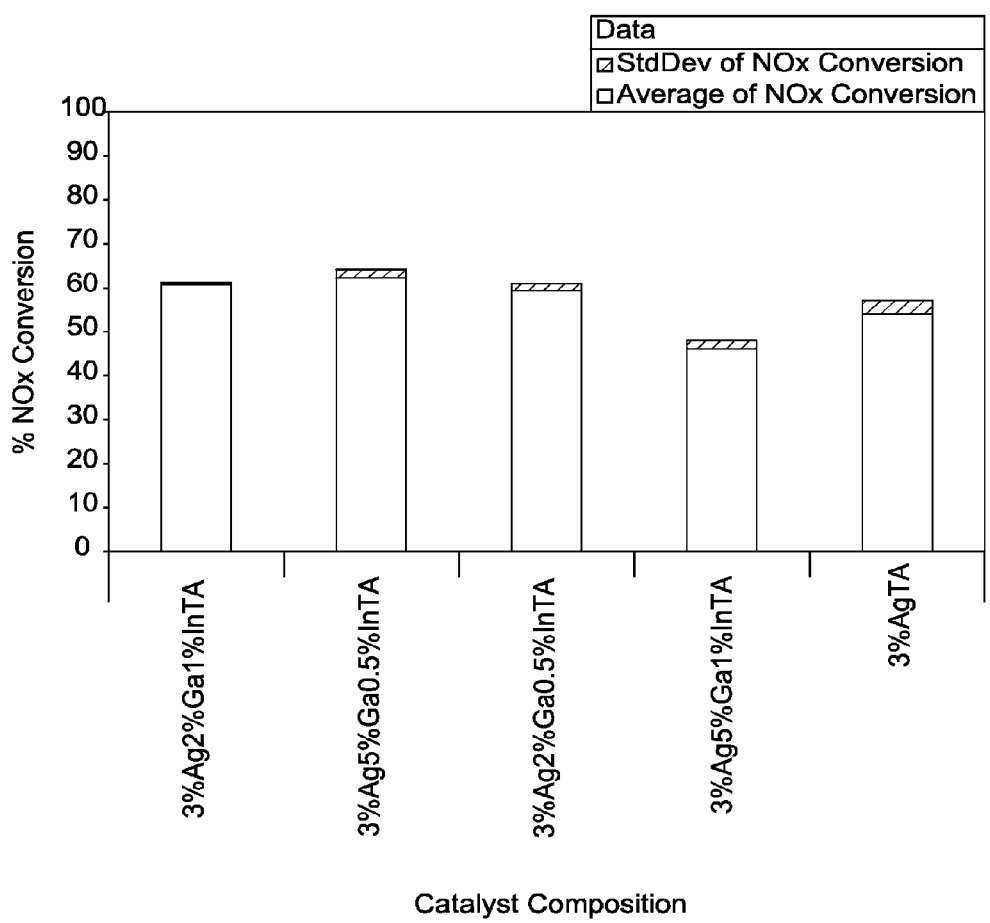

FIGS. 13 and 14 are graphical representations of average NOx conversion, and standard deviation, at 325 degrees Celsius (FIG. 13) and 375 degrees Celsius (FIG. 14) for 3 percent Ag-TA with (from left to right): 2 percent gallium and 1 percent indium; 5 percent gallium and 0.5 percent indium; 2 percent gallium and 0.5 percent indium; 5 percent gallium and 1 percent indium; and (far right) a 3 percent Ag-TA only control. FIGS. 13 and 14 show relatively improved NOx conversion at 375 degrees Celsius for the 3 percent Ag-TA materials with 2 percent gallium and 1 percent indium, 5 percent gallium 0.5 percent indium and 2percent gallium 0.5 percent indium. There is no improvement observed for the 3 percent Ag-TA with 5 percent gallium and 1 percent indium. Lower levels of gallium and indium, alone or in combination, or differing ratio's could have relatively better catalytic activity for NOx reduction. There appears to be a range of improved activity at a ratio of Ga:In of greater than 2:1.

Example 5

Tungsten

Example 5 includes the preparation of 3 percent Ag-Templated Alumina 1.5 percent silver tungstate. A 1-liter, 3-necked flask equipped with a mechanical stirrer and an addition funnel is charged with Al(O$^{sec}$Bu)$_3$ (100 g, 0.40568 mol) and dissolved in 400 ml 2-butanol. The flask is next charged with ethyl acetoacetate (5.3 g, 0.04 mol) and TRITON X-114 (28 g) in 120 ml 2-Butanol. The reaction mixture is stirred for 30 minutes at room temperature. A solution composed of 170 ml 2-butanol and 15 ml H$_2$O is added drop-wise from a dropping funnel to the reaction mixture under continuous stirring by an overhead stirrer. After addition of the entire amount of water and 2-butanol solution, the resulting reaction mixture is allowed to stir at room temperature for 3 hours, and is aged for approximately 12 hours at 95 degrees Celsius.

A solution prepared by dissolving Ag$_2$WO$_4$ (1.4331 g) in the minimum amount of water and NH$_4$OH is added drop-wise, under strong stirring to the reaction mixture. The resulting mixture is allowed to age for another 12 hours at 95 degrees Celsius, it is filtered overnight. The excess surfactant is removed by Soxhlet extraction with ethanol for 24 hours. The obtained solid is dried in a vacuum oven at 50 degrees Celsius overnight.

Figure 15:
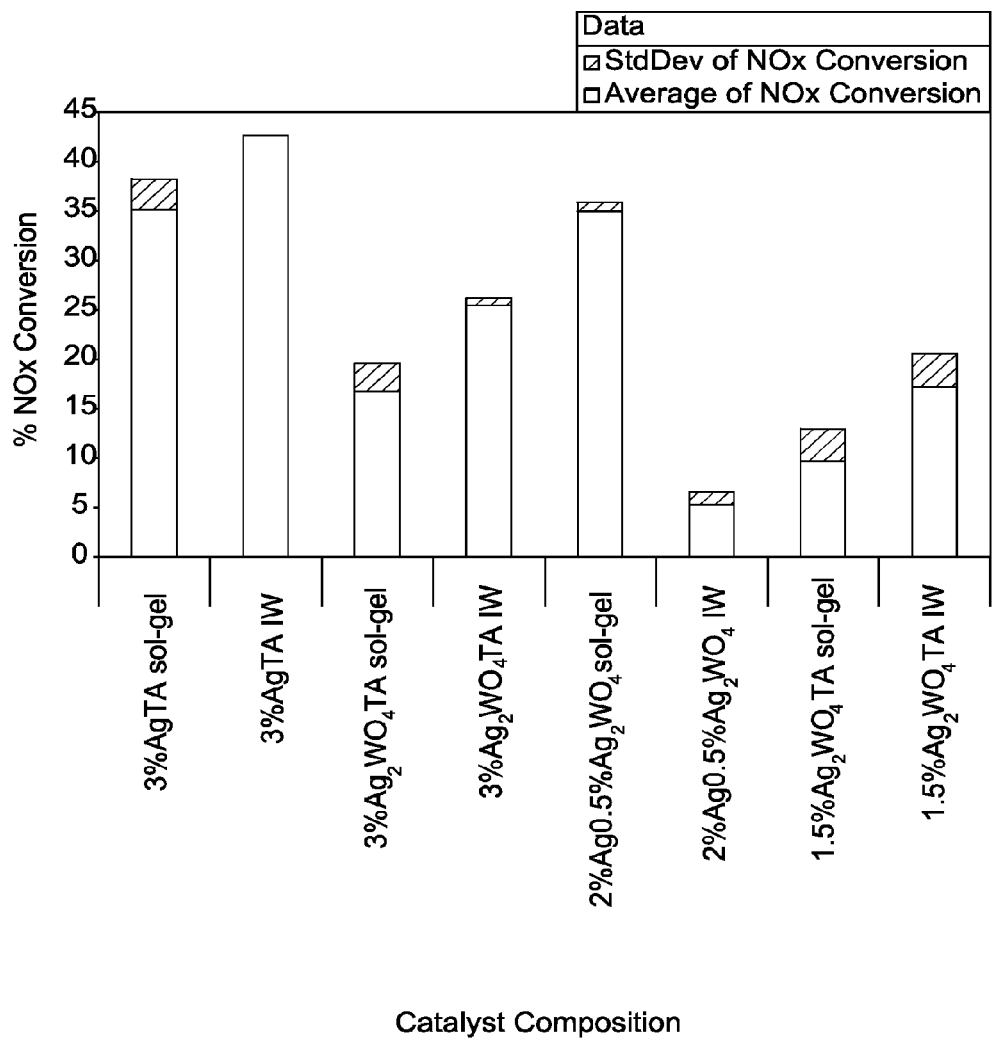
FIGS. 15 and 16 are graphical representations of NOx conversion.
Figure 16:
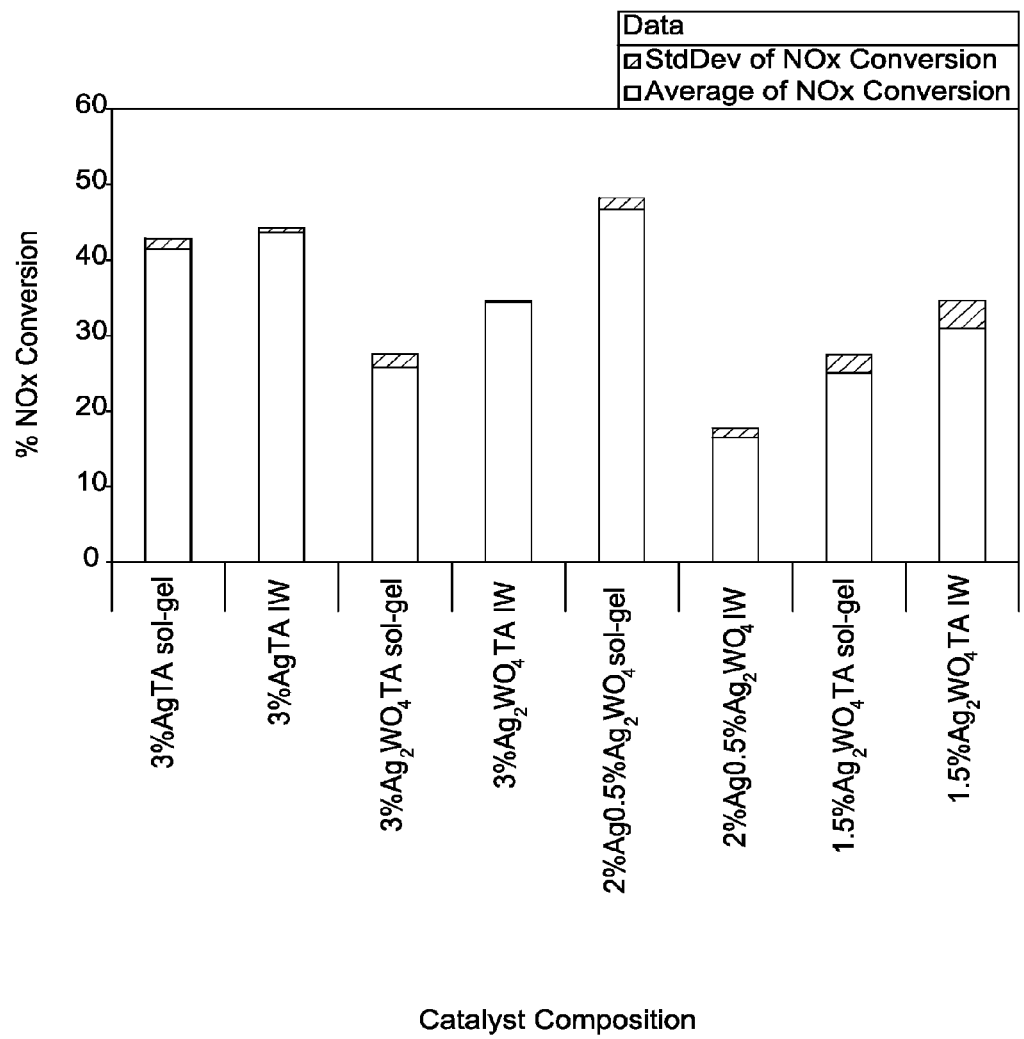

FIGS. 15 and 16 are graphical representations of average NOx Conversion and standard deviation at 325 degrees Celsius (FIG. 15) and 375 degrees Celsius (FIG. 16) for (left to right): 3 percent Ag-TA sol gel; 3 percent Ag-TA IW; 3 percent Ag$_2$WO$_4$-TA sol gel; 3 percent Ag$_2$WO$_4$ TA IW; 2 percent Ag and 0.5 percent Ag$_2$WO$_4$ sol gel (note enhanced activity); 2 percent Ag and 0.5 percent Ag$_2$WO$_4$ IW; 1.5 percent Ag$_2$WO$_4$ sol gel; and 1.5 percent Ag$_2$WO$_4$IW. In FIGS. 15 and 16, at 375 degrees Celsius an enhancement of activity with 0.5 percent $Ag_2WO_4$ and 2 percent silver is noted. An equivalent, or better effect, is possible with a lesser total amount of silver.

Example 6

Zinc

Example 6 includes the preparation of 3 percent Ag-Templated Alumina with 0.5 percent zinc. A 1-liter, 3-neck round bottom flask equipped with a mechanical stirrer, reflux condenser and addition funnel is charged with $Al(O^{sec}Bu)_3$ (49.95 g, 0.2028 mol). 200 mL of 2-Butanol (2-BuOH) are added to the flask. The 2-BuOH is divided in half, one used to transfer the $Al(OsecBu)_3$ and the other the rinse the remaining portion from the container walls.

Following the addition to the flask, the mechanical stirrer is turned on using a low setting and the flask is charged with ethyl acetoacetate (2.655 g, 0.0204 mol), TRITON X-114 (14.05 g, 0.0225 mol) and 60 mL 2-BuOH. This solution is stirred under ambient conditions for 30 minutes. During this time, of $AgNO_3$ (0.5352 g, 0.00315 mol) and $Zn(NO_3)_2 \cdot 6H_2O$ (0.1539 g, $5.1735E^{\circ -4}$ mol) are dissolved in 7.5 mL $H_2O$ and combined with 85 mL of 2-BuOH. This solution is added to the addition funnel. After 30 minutes have elapsed, the addition funnel is turned on and allowed to drip at a controlled pace. The drip rate controls the rate of hydrolysis, which in turn can affect the property and function of the reaction product.

After the hydrolysis is complete, the stirrer is turned up to account for the gaining viscosity of the mixture and a stopper replaced the dropping funnel. The mixture is allowed to stir under ambient conditions for approximately 3 hours following the completion of hydrolysis. After the 3 hours of stirring, the reaction mixture is aged at 95 degrees Celsius for 24 hours with stirring to form a gel. The resulting gel is filtered and extracted using Soxhlet extraction with ethanol for 24 hours to form a solid. The extracted solid is dried in a vacuum oven at 50 degrees Celsius overnight.

Figure 17:
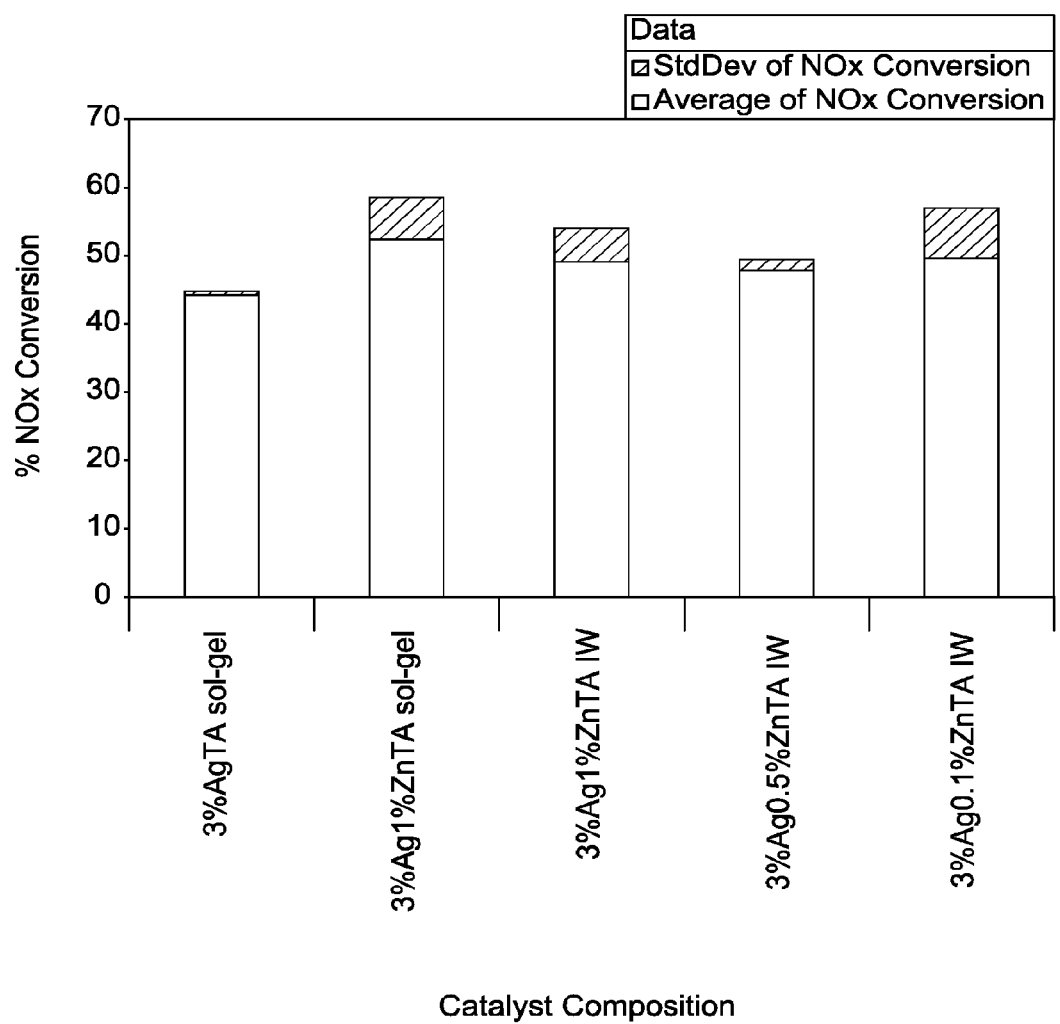
FIGS. 17 and 18 are graphical representations of NOx conversion.
Figure 18:
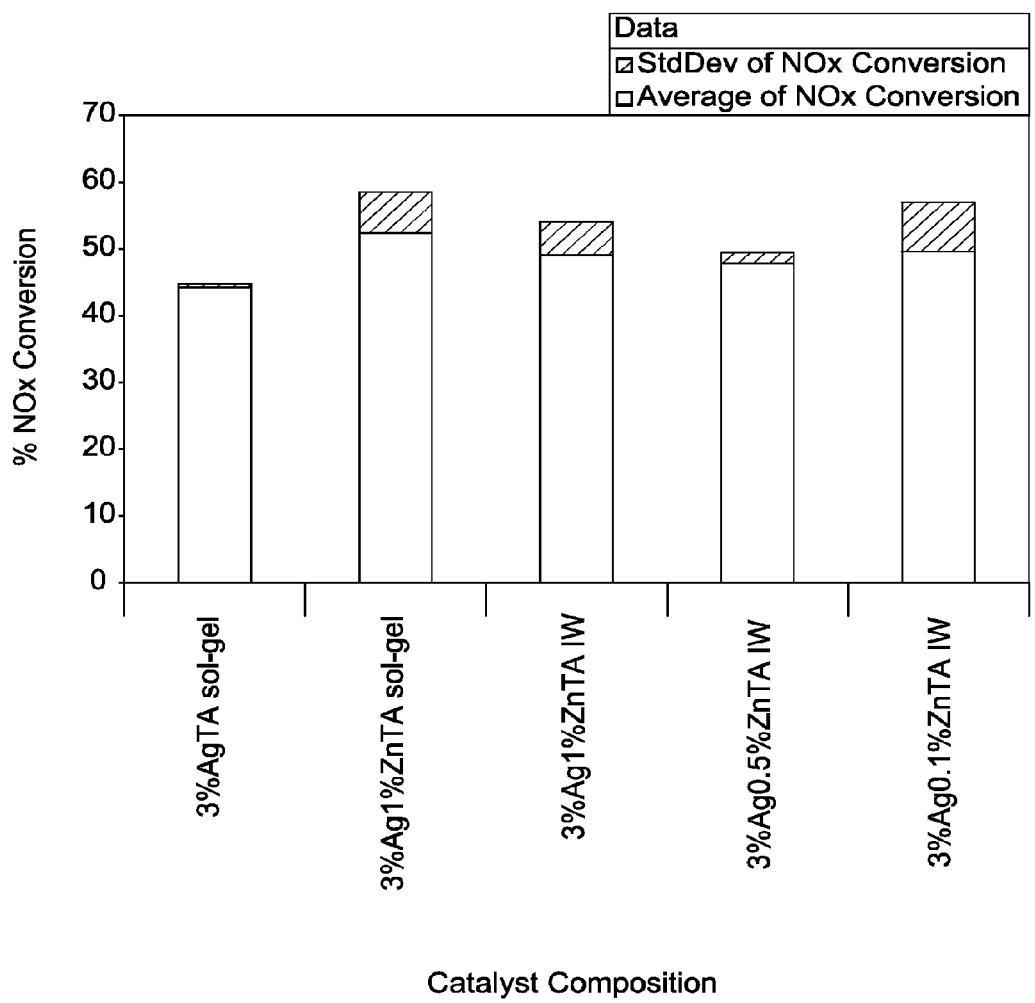

FIGS. 17 and 18 are graphical representations of average NOx Conversion and standard deviation at 325 degrees Celsius and 375 degrees Celsius for (left to right) 3 percent Ag-TA; 3 percent Ag-TA with 1 percent zinc sol gel; 3 percent Ag-TA with 1 percent zinc IW; 3 percent Ag-TA with 0.5 percent zinc IW; and 3 percent Ag-TA with 0.1 percent zinc IW. FIGS. 17 and 18 show that several levels of zinc at temperatures 325 degrees Celsius and 375 degrees Celsius gave improved catalytic activity for NOx conversion compared with 3 percent Ag-TA alone.

Example 7

Platinum

Example 7 includes the preparation of 3 percent Ag-Templated Alumina with 0.05 percent platinum. A 1-liter, 3-neck round bottom flask equipped with a mechanical stirrer, reflux condenser and addition funnel is charged with $Al(O^{sec}Bu)_3$) (50.025 g, 0.203 mol). An aliquot of 200 mL of 2-Butanol (2-BuOH) is added to the flask. The 2-BuOH is divided in half, one used to transfer the $Al(O^{sec}Bu)_3$ and the other the rinse the remaining portion from the container walls. Following the addition to the flask, the mechanical stirrer is turned on using a low setting and the flask is charged with ethyl acetoacetate (2.655 g, 0.0204 mol), TRITON X-114 (14.099 g, 0.0226 mol) and 60 mL 2-BuOH. Platinum (II) acetylacetonate (0.0210 g, 5.34E-05 mol) is added to the flask. The solution is allowed to stir under ambient conditions for 30 minutes. During this time, of $AgNO_3$ (0.5352 g, 0.00315 mol) is dissolved in 7.5 mL $H_2O$ and combined with 85 mL of 2-BuOH. This solution is added to the addition funnel. After 30 minutes had elapsed, the addition funnel is turned on and allowed to drip at a medium pace.

After the hydrolysis is complete, the stirrer is turned on to gain viscosity of the mixture and a stopper replaced the dropping funnel. The mixture is stirred under ambient conditions for approximately 3 hours following the completion of hydrolysis. After 3 hours, the reaction mixture is aged at 95 degrees Celsius for 24 hours with stirring. The resulting gel is filtered and extracted using Soxhlet extraction with ethanol for 24 hours. The extracted solid is dried in a vacuum oven at 50 degrees Celsius overnight.

Figure 19:
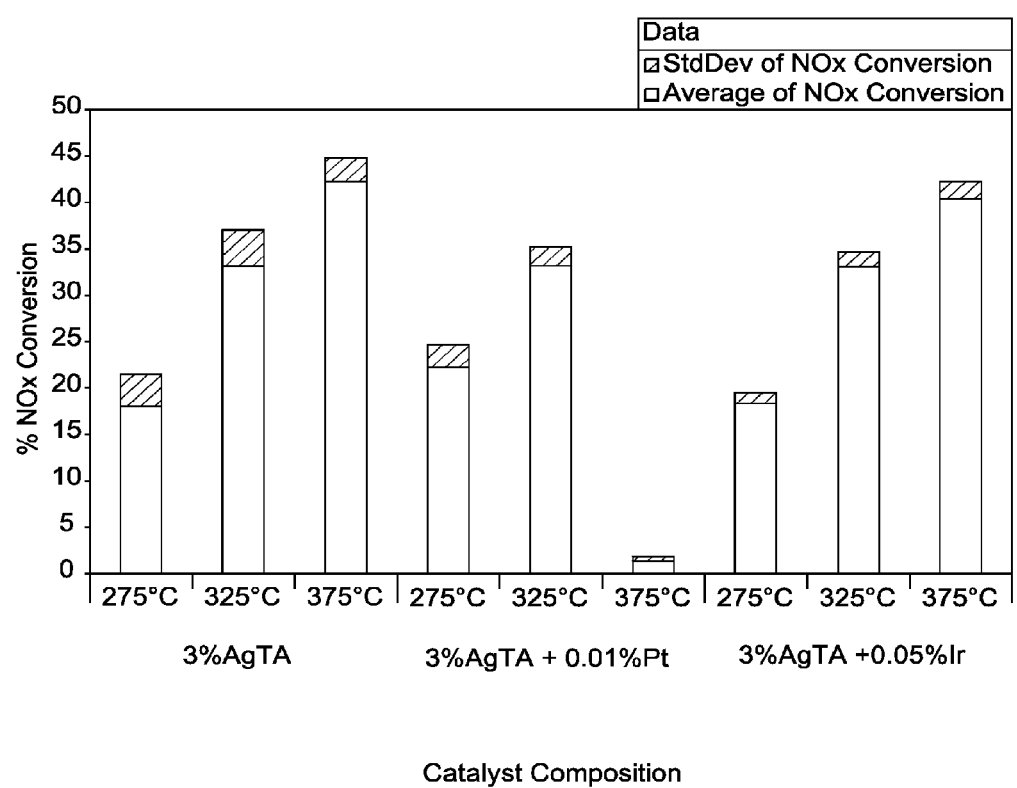
FIG. 19 is a graphical representation of NOx conversion.

FIG. 19 is a graphical representation of average NOx conversion and standard deviation for (left to right) each at 275 degrees Celsius, 325 degrees Celsius and 375 degrees Celsius: 3 percent Ag-TA; 3 percent Ag-TA with 0.01 percent Platinum; 3 percent Ag-TA; and 3 percent Ag-TA with 0.05 percent iridium.

Example 8

Rhodium

Example 8 includes the preparation of 3 percent Ag-Templated Alumina 0.05 percent rhodium. A 1-liter, 3-neck round bottom flask equipped with a mechanical stirrer, reflux condenser and addition funnel is charged with $Al(O^{sec}Bu)_3$) (50.025 g, 0.203 mol). 200 mL of 2-Butanol (2-BuOH) is added to the flask. The 2-BuOH is divided in half, one used to transfer the $Al(O^{sec}Bu)_3$ and the other the rinse the remaining portion from the container walls. Following the addition to the flask, the mechanical stirrer is turned on using a low setting and the flask is charged with ethyl acetoacetate (2.655 g, 0.0204 mol), TRITON X-114 (14.099 g, 0.0226 mol) and 60 mL 2-BuOH. Rhodium (III) acetylacetonate (0.0201 g, 5.02E-05 mol) is added to the flask. This solution is allowed to stir under ambient conditions for 30 minutes. During this time, of $AgNO_3$ (0.5352 g, 0.00315 mol) is dissolved in 7.5 mL $H_2O$ and combined with 85 mL of 2-BuOH. The solution is added to the addition funnel. After 30 minutes had elapsed, the addition funnel is turned on and allowed to drip at a medium pace. After the hydrolysis is complete, the stirrer is turned on to gain viscosity of the mixture and a stopper replaced the dropping funnel. The mixture is stirred under ambient conditions for approximately 3 hours following the completion of hydrolysis. After 3 hours, the reaction mixture is aged at 95 degrees Celsius for 24 hours with stirring. The resulting gel is filtered and extracted using Soxhlet extraction with ethanol for 24 hours. The extracted solid is dried in a vacuum oven at 50 degree Celsius overnight.

Figure 20:
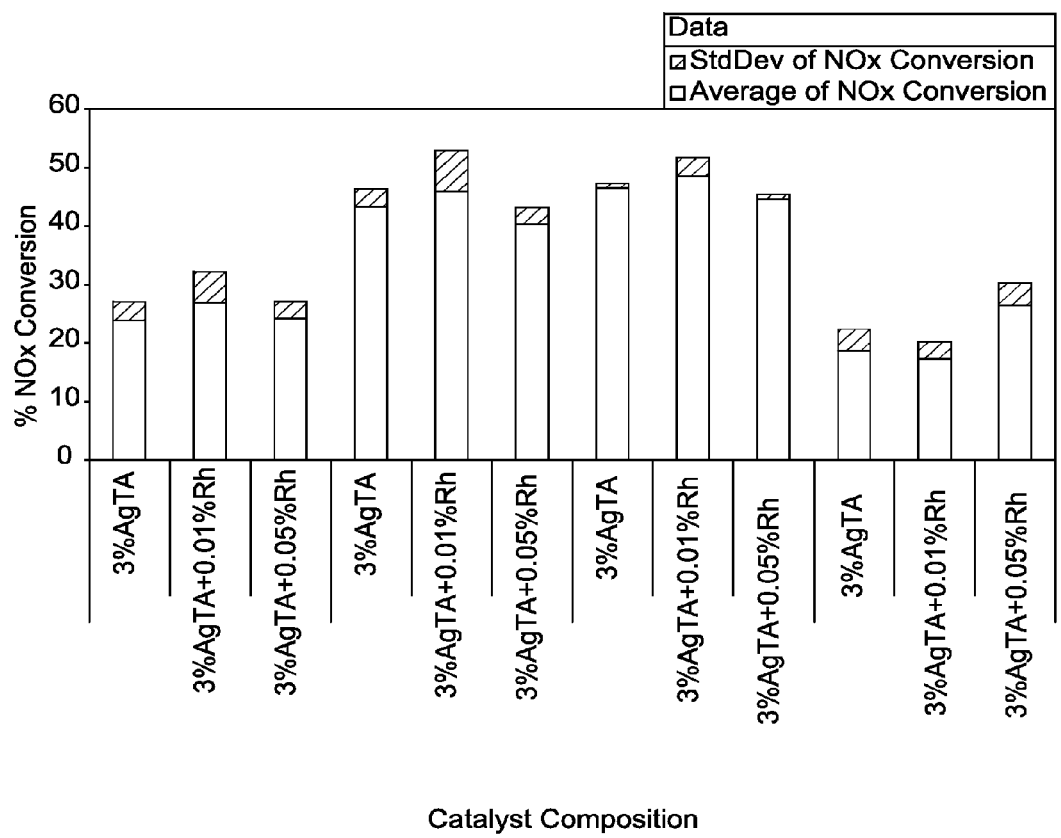
FIG. 20 is a graphical representation of NOx conversion.

FIG. 20 is a graphical representation of average NOx conversion and standard deviation at four temperatures (left to right) 275 degrees Celsius, 325 degrees Celsius, 375 degrees Celsius and 425 degrees Celsius. For each temperature (left to right) 3 percent Ag-TA; 3 percent Ag-TA with 0.01 percent rhodium; and 3 percent Ag-TA with 0.05 percent rhodium. FIG. 20 shows that depending on the temperature the 0.01 percent rhodium and the 0.05 percent rhodium (each added to 3 percent Ag-TA) had superior catalytic activity compared to 3 percent Ag-TA alone.

Figure 21:
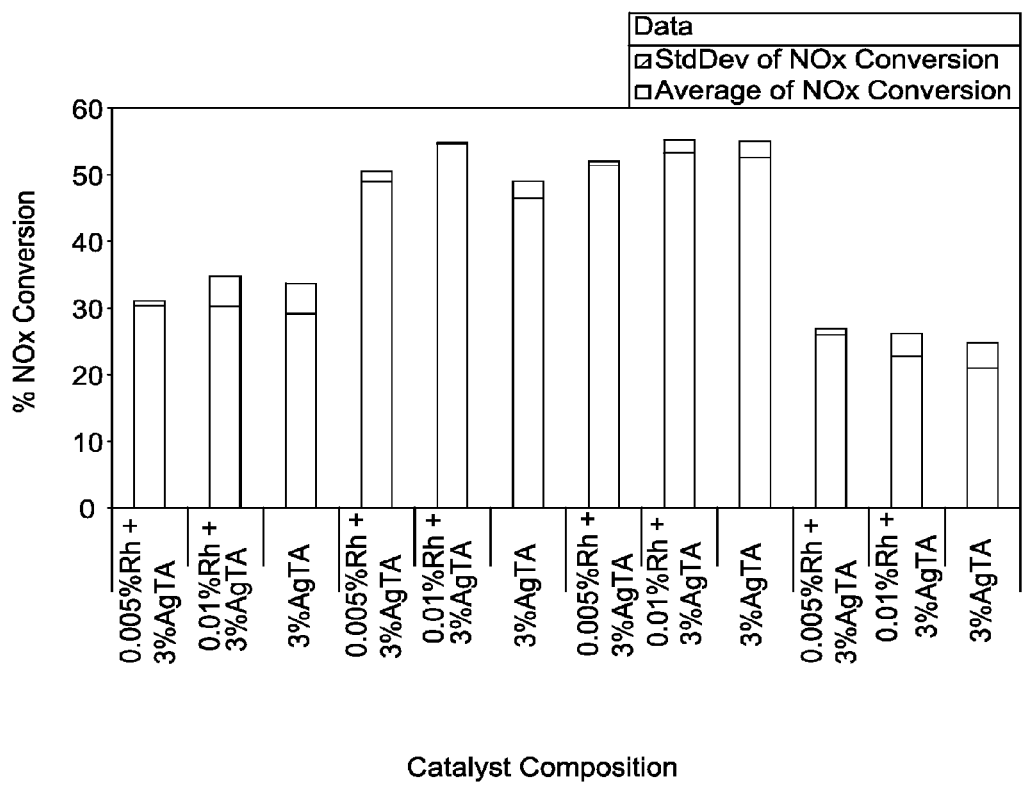
FIG. 21 is a graphical representation of NOx conversion.

FIG. 21 is a graphical representation of average NOx conversion and standard deviation at four temperatures (left to right) 275 degrees Celsius, 325 degrees Celsius, 375 degrees Celsius and 425 degrees Celsius. For each temperature (left to right) 3 percent with Ag-TA with 0.005 percent rhodium; 3 percent Ag-TA with 0.01 percent rhodium; and 3 percent Ag-TA alone. As shown in FIG. 21, at the four temperatures tested, rhodium appeared to give catalytic activity enhancement compared to the 3 percent Ag-TA alone.

Additional Examples and samples are created and formed by affected the following parameters: the type of solvent, the amount of solvent, the hydrolysis rate, the reaction temperature, the amount of catalytic metal in addition to the silver, the amount of silver, the combination of the various catalytic metals (with or without silver), and the templated alumina support. These samples are tested for efficacy in the same manner as the above-disclosed samples.

Testing Procedures:

The reactor mixes gases (using mass flow controllers—MFCs, Brooks and MKS) and up to two liquids (usually water and a liquid reductant) are vaporized. The water and liquid reductant are pumped in under pressure. The gas mixture enters the heated (~115 degrees Celsius) top box and goes into a manifold that contains 32 capillary exit tubes. The gas is restricted in the manifold and the pressure builds up to ~60 psi. Backpressure indicates the same amount of gas is flowing out of each capillary. The capillaries (stainless steel) open up into tubes (INCONEL, stainless steel) where the catalyst is positioned. This zone is a copper block that can be temperature controlled.

The catalyst powders (25-50 mg) are held in place by quartz wool that has been wedged into the tube. Each tube can be individually sampled by controlling the two switching valves. The flow of the outlet stream is measured and recorded. The flow can be diverted through a deep oxidation catalysts ($Pt/Al_2O_3$ from Johnson Matthey) to determine $N_2$ selectivity. The flow passes through a diluter (CAI, Model 701) that takes 25 ml/min from the reactor (which generally puts out ~35-40 mL/min) and mixes it with 1000 ml/min of $N_2$ (~25:1 dilution). The diluted sample is pulled though the $CO/CO_2$ detector (CAI) by a pump in the $NO_x$ detector (CAI, Model 600 HCLD). In generally only the $NO_x$ value is recorded. It is possible to record the NO and $NO_2$ values separately. A LABVIEW program controls many features of the reactor system. The software does not control the MFCs but their settings are recorded. The software controls the temperature of the reactor block and the switching of the values. The software records, CO, $CO_2$ and $NO_x$ from the analyzers. After the feed is completely combusted over the Deep Oxidation Catalyst (DOC) the reductant delivery is checked by measuring $CO_2$ level.

The screening conditions are as follows: gas composition: 12 percent $O_2$, 600 ppm NO, 7 percent $H_2O$, 1 ppm $SO_2$ and the balance $N_2$. The catalysts are pretreated with 7 percent $H_2O$ and 50 ppm $SO_2$, 12 percent $O_2$ for 7 hours at 450 degrees Celsius to "age" or sulfur soak the catalysts. The reductant used is a liquid mixture composed of: 2,2,4, Trimethylpentane (64 weight percent), octane (7 weight percent) and toluene (29 weight percent), also known as Moctane. Another liquid reductant used in a few experiments is a distillation cut (<210 degrees Celsius) of ultra low sulfur diesel (ULSD) fuel. For all the experiments mentioned using the HTS reactor, the Cl:NO ratio used is 8 (Cl:NO is defined as the number of carbon atoms in the reductant stream per number of NO molecules). Each run examines the catalysts at 3 different temperatures 275 degrees Celsius, 375 degrees Celsius and 425 degrees Celsius and the catalysts are usually tested in triplicates. Data is presented as percent NOx conversion by measuring the $NO_x$ concentration through tube #1 with no catalyst present and measuring the $NO_x$ concentration over the other tubes with catalysts and determining the percent change.

The catalysts screened in the 32-tube reactor are prepared by incipient wetness impregnation of the sized support (425-710 nanometers) with a $AgNO_3$ solution. The volume of the $AgNO_3$ solution used is twice the pore volume of the support and contained the correct number of moles of Ag to hit the target mole percent. The pore volume of the support is obtained from the BET measurement report. The catalysts containing 2 mole percent Ag on Norton alumina is called AgSTD and is present in every run as a control. The impregnated materials are dried in a vacuum oven at 80 degrees Celsius and calcinated in air at 600 degrees Celsius for 6 hours in a box furnace. The prepared catalysts are weighed out (~50 mg) and placed in 2 ml GC vials until used in the reactor. The exact weight of each catalyst is measured using a Bohdan weighing robot.

Scale-Up Reactor

The experimental setup is as follows. The catalyst to be tested is installed in a quartz-tube reactor (19 mm I.D.) located inside a furnace. Temperature, pressure, space velocity over the catalyst, and gas composition at the inlet of the reactor are controlled. This reactor is fully automated and experimental test matrix can be run over an extended period of time (days or weeks). Analytical lines allow for the measurement of NO, $NO_2$ (chemiluminescence detector), CO, $CO_2$ (IR detector), and $SO_2$ (UV-Vis detector). Also, a deep oxidation catalytic bed located before the analytical lines can be either flown through or by-passed. When by-passed, the NOx concentration measured ($NO+NO_2$) is referred to as "NOx concentration". When flown through the Deep Oxidation Catalyst (DOC, Johnson-Matthey catalyst, $Pt/Al_2O_3$, SV<20000 $hr^{-1}$, T=450 degrees Celsius), the NOx concentration measured ($NO+NO_2$) is referred to as "NOt concentration". Therefore, the difference between those two values (NOx concentration–NOt concentration) corresponds to the quantity of NOx species that reacted in the quartz-tube reactor to form new chemicals, which are oxidized back to NO or $NO_2$ in the DOC. These nitrogen-containing species are called RONOs. RONOs are unidentified by-products of the SCR reaction of NOx to nitrogen.

Catalysts are tested under experimental conditions reported in Table 1. The total powder catalyst weight is 2.7 grams. The total volumetric flow rate over the catalyst is 3 SLPM.

The powder bed is placed at least 24" from the inlet of the quartz tube to allow for preheating of the feed gas. The powder bed is packed between two 0.5 grams plugs of quartz wool.

TABLE 1

Experimental Conditions

| X's | values |
|---|---|
| (NO) (ppm) | 475, 610, 690 |
| (O2) percent | 12 |
| C1:NO | 6 |
| H2:NO ratio | 0, 3:1 |
| (H2O) percent | 7 |
| Temperature (degrees Celsius) | 275, 375, 430 |
| (SO2) (ppm) | 0 |

TABLE 1-continued

Experimental Conditions

| X's | values |
|---|---|
| CO (ppm) | 250 |
| CO2 (percent) | 0 |

Moctane, Ethylene+Propylene (C2_C3), Ultra Low Sulfur Diesel (ULSD) and Diesel Fraction 1 are used as reductants. Liquid reductants are pumped by a HPLC pump (ASI model 500G) and vaporized/diluted at 300 degrees Celsius with nitrogen before being injected in the reactor. Gaseous reductants are metered and delivered with Mass Flow Controllers (MFCs). The amount of reductant injected is quantified by deep oxidation on $Pt/Al_2O_3$ catalyst at 450 degrees Celsius (space velocity below 20,000 $hr^{-1}$) followed by the measurement of $CO_2$ concentration in the gas stream. The assumption that full catalytic combustion of the reductants took place is validated by the fact that very low CO concentrations are measured. In addition, deep oxidation of reductants provided the Cl (ppm of molecular carbon) equivalent number (equal to $CO_2$ concentration, in ppm), which allows for the computation of the Cl/NO ratio.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

In describing, the products of the instant invention as a reaction product of initial materials reference is made to the initial species recited and it is to be noted that additional materials may be added to the initial mixture of synthetic precursors. These additional materials may be reactive or non-reactive. The defining characteristic of the instant invention is that the reaction product is obtained from the reaction of at least the components listed as disclosed. Non-reactive components may be added to the reaction mixture as diluents or to impart additional properties unrelated to the properties of the composition prepared as a reaction product. Thus for example finely divided solids such as pigments may be dispersed into the reaction mixture, before during or after reaction to produce a reaction product composition that additionally comprises the non-reactive component, e.g. the pigment. Additional reactive components may also be added; such components may react with the initial reactants or they may react with the reaction product; the phrase "reaction product" is intended to include those possibilities as well as including the addition of non-reactive components.

The embodiments described herein are examples of composition, articles, systems and methods having elements corresponding to the elements of the invention recited in the claims. This written description may enable those of ordinary skill in the art to make and use embodiments having alternative elements that likewise correspond to the elements of the invention recited in the claims. The scope of the invention thus includes articles, systems and methods that do not differ from the literal language of the claims, and further includes other articles, systems and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. A method, comprising: reacting a metal alkoxide, a silver composition, a catalyst metal composition and a templating agent to form a reaction product; hydrolyzing the reaction product to form a hydrolyzed reaction product; condensing the hydrolysed reaction product to form a templated substrate; and controlling the reacting, hydrolysing and condensing step to control the silver loading of the templated substrate.

2. The method as defined in claim 1, controlling the silver loading so that the silver is present in an amount of at least about three weight percent based on a total weight of the material that is the templated substrate.

3. The method as defined in claim 1, wherein the condensing step includes calcinating.

4. The method as defined in claim 1, wherein the hydrolyzing step comprises hydrolyzing the reaction product over a period that is greater than about 1 hour.

5. A method, comprising: introducing a gas stream in a chamber that includes a catalyst composition made by the method of claim 1 and reducing nitrogen oxide present in the gas stream at a temperature that is greater than about 275 degrees Celsius.

6. The method as defined in claim 5, wherein the reducing nitrogen oxide comprises maintaining a temperature in the chamber that is greater than about 275 degrees Celsius and that is less than about 325 degrees Celsius.

* * * * *